(12) United States Patent
Kubota et al.

(10) Patent No.: US 6,353,613 B1
(45) Date of Patent: Mar. 5, 2002

(54) INFORMATION TRANSMITTER DEVICE AND TRANSMITTING METHOD

(75) Inventors: Tatsuya Kubota; Hiroaki Seto; Youichi Matsumura, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/011,941

(22) PCT Filed: Jul. 2, 1997

(86) PCT No.: PCT/JP97/02277

§ 371 Date: Feb. 20, 1998

§ 102(e) Date: Feb. 20, 1998

(87) PCT Pub. No.: WO98/00952

PCT Pub. Date: Jan. 8, 1998

(30) Foreign Application Priority Data

Jul. 2, 1996 (JP) .............................. 8-191467
Jul. 2, 1996 (JP) .............................. 8-191468

(51) Int. Cl.[7] .............................................. H04L 12/28
(52) U.S. Cl. ..................................................... 370/389
(58) Field of Search ................................ 370/389, 409, 370/390, 392, 434, 477, 316, 470, 238, 352, 427–428, 355, 398–399, 394–395, 411, 252, 462–465, 455; 348/423; 455/4.2; 382/232; 386/68

(56) References Cited

U.S. PATENT DOCUMENTS 5,164,937 A * 11/1992 Tanabe et al. .............. 370/434
5,430,738 A * 7/1995 Tsuda .......................... 455/507
5,647,047 A * 7/1997 Ting et al. .................... 386/68
5,684,893 A * 11/1997 Shikakura ................... 382/232
5,835,493 A * 11/1998 Magee et al. ............... 370/394
5,892,535 A * 4/1999 Allen et al. .................. 455/4.2
5,930,251 A * 7/1999 Murakami et al. .......... 370/395
5,966,385 A * 10/1999 Fujii et al. ................... 370/465

FOREIGN PATENT DOCUMENTS

| EP | 0497452 A2 | 8/1992 |
| JP | 2-58443 | 2/1990 |
| JP | 3-273736 | 12/1991 |
| JP | 4-245833 | 9/1992 |

* cited by examiner

*Primary Examiner*—Wellington Chin
*Assistant Examiner*—Prenell Jones
(74) *Attorney, Agent, or Firm*—Frommer Lawrence & Haug LLP; William S. Frommer; Dexter T. Chang

(57) ABSTRACT

An information transmitter includes a signal separator for separating a packet line multiplexed by another transmitting device into a packet line of element data and a packet line of second additional information on the element data; an additional information generator for generating third additional information integrated by combining and regenerating the second additional information and first additional information; and a controller for controlling packet identifiers which are added at encoders and instructing a plurality of encoding to add packet identifiers that are different from each other. Thus, the overlaps of additional information and packet identifier information can be easily avoided with a simple construction.

14 Claims, 22 Drawing Sheets

| PID VALUE | INFORMATION TO BE STORED |
|---|---|
| 0X0000 | PAT |
| 0X0001 | CAT |
| 0X0002~0X000F | Reserved |
| 0X0010 | NIT, ST |
| 0X0011 | SDT, BAT, ST |
| 0X0012 | EIT, ST |
| 0X0013 | RST, ST |
| 0X0014 | TDT |
| 0X0015~0X001F | Reserved |
| 0X0020~0X1FFE | PMT, Video, Audio, etc. |
| 0X1FFF | NULL Packet |

| ENCODER | ELEMENT | PID |
|---|---|---|
| ENCODER 26 | Video | 0X0100 |
| | Audio | 0X0101 |
| ENCODER 27 | Video | 0X0102 |
| | Audio | 0X0103 |
| ENCODER 28 | Video | 0X0104 |
| | Audio | 0X0105 |
| ENCODER 29 | Video | 0X0106 |
| | Audio | 0X0107 |

| ENCODER | ELEMENT | PID |
|---|---|---|
| ENCODER 55 | Video | 0X0100 |
| | Audio | 0X0101 |
| ENCODER 56 | Video | 0X0102 |
| | Audio | 0X0103 |
| ENCODER 57 | Video | 0X0104 |
| | Audio | 0X0105 |
| ENCODER 58 | Video | 0X0106 |
| | Audio | 0X0107 |

| ENCODER NAME | ELEMENT | PID VALUE BEFORE CORRECTION | PID VALUE AFTER CORRECTION |
|---|---|---|---|
| ENCODER 26 | Video | 0X0100 | 0X0108 |
| | Audio | 0X0101 | 0X0109 |
| ENCODER 27 | Video | 0X0102 | 0X010A |
| | Audio | 0X0103 | 0X010B |
| ENCODER 55 | Video | 0X0100 | 0X0100 |
| | Audio | 0X0101 | 0X0101 |
| ENCODER 56 | Video | 0X0102 | 0X0102 |
| | Audio | 0X0103 | 0X0103 |
| ENCODER 57 | Video | 0X0104 | 0X0104 |
| | Audio | 0X0105 | 0X0105 |
| ENCODER 58 | Video | 0X0106 | 0X0106 |
| | Audio | 0X0107 | 0X0107 |

Encoders 26, 27 : TRANSMITTING DEVICE 21
Encoders 55–58 : TRANSMITTING DEVICE 22

FIG. 16

| ENCODER NAME | PROGRAM NUMBER BEFORE CORRECTION | PROGRAM NUMBER AFTER CORRECTION |
|---|---|---|
| ENCODER 26 | 0X0001 | 0X0005 |
| ENCODER 27 | 0X0002 | 0X0006 |
| ENCODER 55 | 0X0001 | 0X0001 |
| ENCODER 56 | 0X0002 | 0X0002 |
| ENCODER 57 | 0X0003 | 0X0003 |
| ENCODER 58 | 0X0004 | 0X0004 |

Rows 1-2: TRANSMITTING DEVICE 21
Rows 3-6: TRANSMITTING DEVICE 22

FIG. 17

| ENCODER | ELEMENT | INITIAL PID | REGENERATED PID |
|---|---|---|---|
| ENCODER 4 | Video | 0x0100 | 0x0100 |
| | Audio | 0x0101 | 0x0101 |
| ENCODER 5 | Video | 0x0100 | 0x0102 |
| | Audio | 0x0101 | 0x0103 |
| ENCODER 6 | Video | 0x0100 | 0x0104 |
| | Audio | 0x0101 | 0x0105 |
| ENCODER 7 | Video | 0x0100 | 0x0106 |
| | Audio | 0x0101 | 0x0107 |

| ENCODER | ELEMENT | PID |
|---|---|---|
| ENCODER 43 | Video | 0X0100 |
| | Audio | 0X0101 |
| ENCODER 44 | Video | 0X0102 |
| | Audio | 0X0103 |
| ENCODER 45 | Video | 0X0104 |
| | Audio | 0X0105 |
| ENCODER 46 | Video | 0X0106 |
| | Audio | 0X0107 |

Description of Reference Numerals 1, 20... digital broadcasting system, 2, 21, 22... transmitting device, 3... receiving device, 4 to 7, 26 to 29, 55 to 58... encoder, 8, 30, 53, 93... multiplexer, 9, 59, modulator, 10, 60... transmitting antenna, 25, 54, 92... controller unit, 50... receiving section, 51... receiving antenna, 52... demodulating section, 67... SI/PSI regenerator, 68... PID regenerator 1, 40... digital broadcasting system, 2, 41... transmitting device, 3.. receiving device, 4 to 7, 43 to 46... encoder, 8, 47... multiplexer, 9... modulator, 10... transmitting antenna, 12, 60... video encoder, 13, 61... audio encoder, 14, 55... PAT/PMT generator, 30... PAT/PMT regenerator, 32...PID regenerator, 42... controller unit, 50... receiving antenna, 51... demodulator, 52... decoder, 54... controller

INFORMATION TRANSMITTER DEVICE AND TRANSMITTING METHOD

TECHNICAL FIELD

The present invention relates to an information transmitting device and a transmitting method, and is suitably applied to a digital broadcasting system which broadcasts upon digitalizing information such as video and audio for example.

BACKGROUND ART

Heretofore, various compression encoding systems have been proposed to decrease the volume of information of video and audio. One representative system is a compression encoding system called MPEG2 (Moving Picture Experts Group Phase 2) which is standardized by the organization such as ISO (International Organization for Standardization). The MPEG2 system has been standardized in order to transmit video and audio.

In recent years, a digital broadcasting system has been devised, which compression-encodes video and audio utilizing the MPEG2 system and broadcasts the compression-encoded video and audio utilizing the ground wave and satellite wave. In the digital broadcasting system, encoded video data and audio data are packetted for every fixed block and the resultant packet lines are transmitted (hereinafter, the packet line is referred to as a transport stream and the packet for generating the transport stream is referred to as a TS (transport stream) packet). In this case, the transport stream packet (TS packet) is comprised of a data section and a header section as shown in FIG. 1, and wherein the data section stores video data and audio data to be transmitted and the header section stores a synchronous byte and a packet identifier (hereinafter, referred to as PID) or various other packet control data. In this connection, the synchronous byte is data showing the beginning of packet and the PID is data showing the content of information stored in the packet.

Further, in the digital broadcasting system, by packetting the data to be transmitted, video and audio data of plural programs are multiplexed so that plural programs can be broadcast through one circuit. However, in the case of multiplexing data of plural programs, the receiver side must extract and decode the TS packet in which the video data and audio data of the program desired by an audience have been stored, from the transmitted TS packets. Therefore, the extracting work makes the process of the receiver side complicated.

Thus, in the digital broadcasting system, additional information on the program called program specific information (PSI) is packetted and transmitted, and the receiver side refers to the PSI to extract and decode the TS packet having the desired program. In this connection, in case of packetting the PSI, the PSI is stored in the data section having the packet structure shown in FIG. 1.

The PSI is roughly classified into a program map table (PMT), a program association table (PAT), a conditional access table (CAT), and a network information table (NIT). The PMT is a corresponding table (hereinafter, referred to as a table) showing the PID values of the TS packets in which video data and audio data to form the program are stored. For example, in the program number "X", the table shows that the video is PID="XV" and the audio is PID="XA". Further, the PAT is a table showing the PID value of the TS packet in which the PMT is stored. For example, the table shows that the PMT with the program number "0" is PID="AA", the PMT with the program number "1" is PID="BB", and the PMT with the program number "X" is PID="XX". Further, the CAT is a table showing the PID value of the TS packet in which lock code decipher information for deciphering the scrambled video and audio data is stored. Furthermore, the NIT is a table showing the PID value of the TS packet in which physical information on transmission route is stored, and the PID value of the TS packet in which the NIT is stored is designated by the PAT.

When the PSI is transmitted, the receiver side first obtains the PAT by extracting the TS packet in which the PAT has been stored, examines the TS packet in which the PMT for the program desired by the audience has been stored by referring to the PAT, and obtains the PMT by extracting the corresponding TS packet. Then, the receiver side refers to the PMT to examine the TS packet in which video and audio data of the program desired by the audience, and extracts the corresponding TS packet to obtain and decode the video and audio data. Thereby, the program desired by the audience can be easily reproduced.

Note that, in the digital broadcasting system, additional information on a program called service information (SI) is transmitted other than aforementioned information, and is utilized with various forms at the receiver side. In this connection, the SI is classified into a bouquest association table (BAT), a service description table (SDT), an event information table (EIT), a time and date table (TDT), a running status table (RST), a stuffing table (ST), and so on. And the detailed SI is disclosed in the literature "Digital Broadcasting Systems for television, sound and data services; Specification for Service Information (SI) in Digital Video Broadcasting (DVB) systems (ETS 300 468)" published by the Europe electric transmission standardization association (ETSI).

In this connection, the PID values of TS packets in which the aforementioned PSI and SI or video data and audio data are stored are determined in advance as shown in FIG. 2. More specifically, the PAT is stored in the TS packet having the "0X0000" PID, and the CAT is stored in the TS packet having the "0X0001" PID. Further, the TS packet having the "0X0010" PID stores the NIT and ST, the TS packet having the "0X0011" PID stores the SDT, BAT, and ST, the TS packet having the "0X0012" PID stores the EIT and ST, the TS packet having the "0X0013" PID stores the RST and ST, and the TS packet having the "0X0014" PID stores the TDT. Furthermore, the TS packets having from the "0X0020" PID to the "0X1FFE" PID store the PMT and NIT or video data and audio data.

By the way, in the case of realizing the digital broadcasting system described above, the construction shown in FIG. 3 will be generally considered. More specifically, as shown in FIG. 3, a digital broadcasting system 1 is comprised of a transmitting device 2 which is equivalent to a broadcasting station, for encoding and transmitting video and audio data, and a receiving device 3 which is installed in each home, for receiving and decoding the data transmitted from the transmitting device 2.

In such the digital broadcasting system 1, when the transmitting device 2 receives a transport stream multiplexed at another transmitting device and newly multiplexes another program onto the multiplexed transport stream to transmit it, the receiving device 3 must surely receive it on the basis of the additional information of packet.

Further, in the digital broadcasting system shown in FIGS. 1 to 3, when such the PSI is transmitted, the receiver side first extracts the TS packet having the "0X0000" PID in which the PAT has been stored in order to obtain the PAT, and then extracts TS packet in which PMT for the program desired by the audience has been stored, by referring to the PAT in order to obtain the PMT. Next, the receiver side examines the TS packet in which the video and audio data of the program desired by the audience has been stored, on the basis of the PMT, and extracts the TS packet to obtain and decode the video and audio data. Thus, the receiver side can easily reproduce the program desired by the audience.

DISCLOSURE OF THE INVENTION

The present invention intends to propose an information transmitting device and transmitting method including other transmitting devices, which can surely decode data with a simple construction as possible in the case of multiplexing and transmitting a plurality of packet lines outputted from a plurality of encoding means.

The present invention comprises a plurality of encoding means for encoding inputted input data, and packetting and outputting the encoded data for every fixed block, an additional information generating means for generating first additional information on the packetted input data and packetting and outputting the first additional information, a signal separating means for separating a packet line multiplexed by another transmitting device into a packet line of element data and a packet line of second additional information on the element data, an additional information regenerating means for combining the first additional information and the second additional information to generate one piece of third additional information, and packetting and outputting the third additional information, and a multiplexing means for multiplexing the packet line of third additional information, a plurality of packet lines outputted from the plurality of encoding means, and the packet line of element data to convert them into one packet line, and outputting it.

In this way, the packet line multiplexed by the other transmitting device is separated into a packet line of element data and a packet line of the second additional information on the element data, and then, the third additional information is generated by combining the first additional information and the second additional information. Thereby, the overlap of additional information can be avoided with a simple construction.

Further, the present invention comprises a plurality of encoding means for encoding inputted input data, and packetting and outputting the encoded data for every fixed block, a signal separating means for separating a packet line multiplexed by another transmitting device into a packet line of element data and a packet line of first additional information on the element data, an additional information generating means for receiving the packet line of the first additional information, generating third additional information by adding the first additional information to the second additional information on the packetted input data, and packtting and outputting the third additional information, and a multiplexing means for converting the packet line of the third additional information and a plurality of packet lines outputted from the encoding means and the packet line of element data into one packet line by multiplexing, and sending the packet line.

In this way, the packet line multiplexed by another transmitting device is separated into the packet line of element data and the packet line of the first additional information on the element data, and the third additional information is generated by adding the first additional information to the second additional information on the packetted input data. Thereby, the overlap of additional information can be avoided without regenerating additional information, thus the overlap of additional information can be avoided with further simple construction.

Further, the present invention provides a packet identifier correcting means for correcting packet identifiers so that the packet identifier added to each packet of element data is different from the packet identifier added to each packet outputted from the encoding means. In this way, the packet identifier correcting means is provided to correct the packet identifiers, thereby the overlap of packet identifiers can be easily avoided.

Further, the present invention provides a plurality of encoding means for encoding input data, and packetting the encoded data for every fixed block and adding a packet identifier to the generated packet to output it, a control means for controlling packet identifiers which are added by the encoding means and for instructing the plurality of encoding means to add packet identifiers different from each other, and a multiplexing means for multiplexing a plurality of packet lines outputted from the plurality of encoding means to form one packet line and outputting the packet line.

Accordingly, the control means controls the packet identifiers to instruct the plurality of encoding means so as to add packet identifiers different from each other, and the plurality of encoding means add the packet identifiers in accordance with the instruction. Thereby, the overlap of packet identifiers can be easily avoided without regenerating packet identifiers added by the respective encoding means.

Furthermore, the present invention provides a plurality of encoding means for encoding input data, and packetting the encoded data for every fixed block and adding packet identifiers to the generated packets to output them; an additional information generating means for generating additional information showing the relationship between the input data and the packet identifier, on the basis of the packet identifier which is added by the encoding means, and packetting and outputting the additional information; and a multiplexing means for converting a plurality of packet lines outputted from the plurality of encoding means and a packet line of the additional information into one packet line by multiplexing and sending the packet line.

Accordingly, since an additional information generating means is provided separately from the encoding means to generate additional information on the basis of the packet identifier which is added by the encoding information without generating additional information respectively by a plurality of encoding means, the additional information matching to the multiplexed packet line can be generated without regenerating the additional information.

BRIEF DESCRIPTION OF THE DRAWINGS

FIG. 16 is a table showing PID values to be modified;

FIG. 17 is a table showing numbers of programs to be modified;

BEST MODE FOR CARRYING OUT THE INVENTION (1) First Embodiment

Figure 3:
FIG. 3 is a block diagram showing the construction of a digital broadcasting system which is the premise of this invention.
Figure 4:
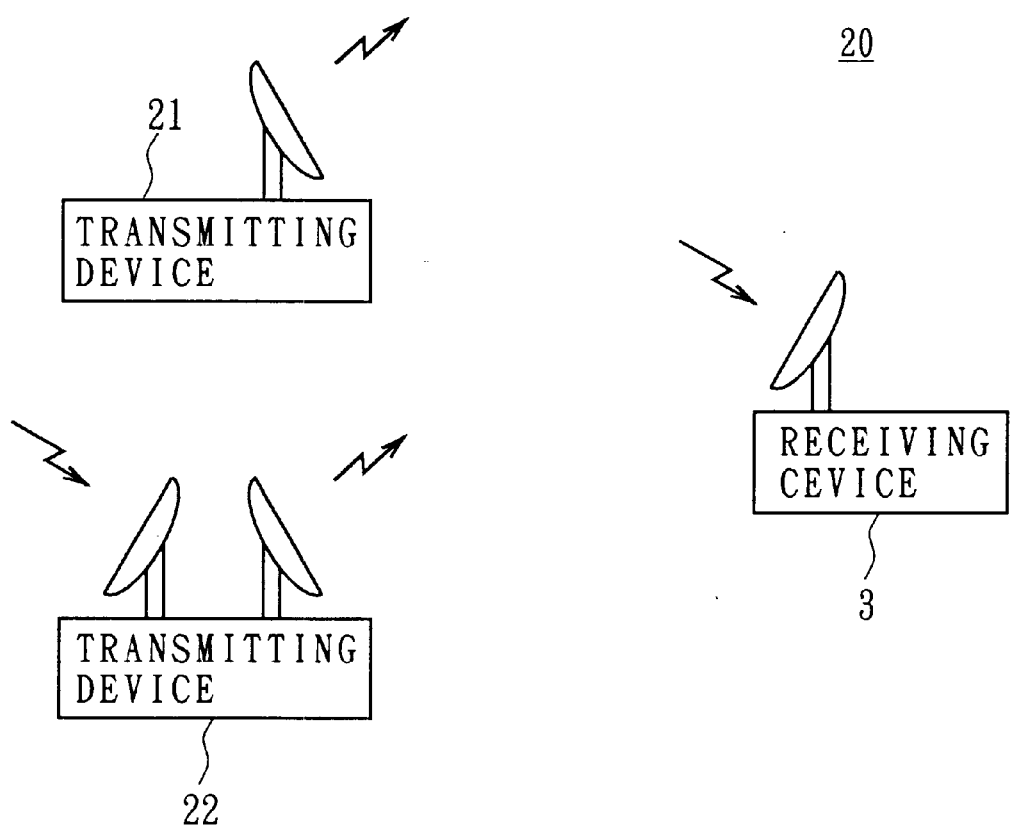
FIG. 4 is a block diagram showing a digital broadcasting system according to a first embodiment of this invention.

In FIG. 4, where the same reference numerals are applied to parts corresponding to FIG. 3, numeral 20 generally shows a digital broadcasting system according to this embodiment and is roughly comprised of first and second transmitting devices 21 and 22 and a receiving device 3 for receiving a transmission signal transmitted from the transmitting device 21 or 22.

The first transmitting device 21 multiplexes video and audio data of plural programs and transmits it utilizing a predetermined satellite wave. The second transmitting device 22 receives a transmission signal transmitted from the first transmitting device 21, multiplexes video data and audio data of a new different program onto the received video and audio data, and transmits it utilizing a different satellite wave.

Figures 5, 7:
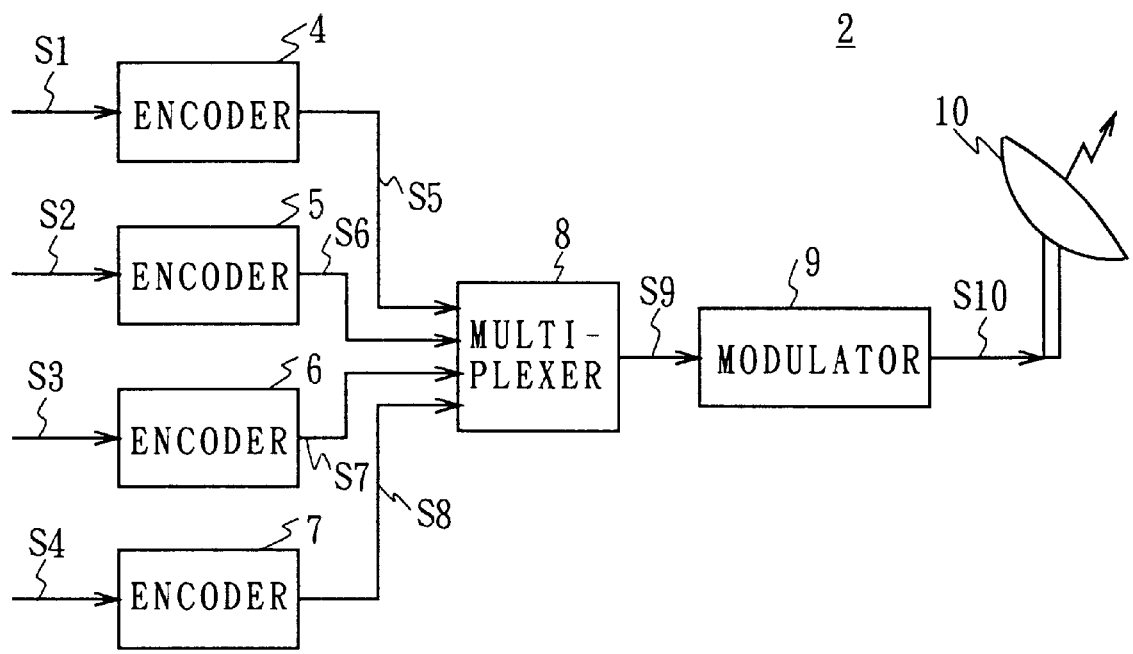
FIG. 5 is a block diagram showing the construction of a transmitting device 2 of FIG. 3.
FIG. 7 is a table showing PID values which are assigned to respective encoder.

A transmitting device 2X which is the premise of the transmitting device 21 or 22 generally has the structure shown in FIG. 5. Specifically, as shown in FIG. 5, the transmitting device 2X is comprised of encoders 4 to 7 for encoding inputted video data and audio data S1 to S4 of each program in accordance with the MPEG2 system and packetting and outputting the encoded data for every fixed block, a multiplexer 8 for multiplexing transport streams S5 to SB outputted from the encoder 4 to 7 to convert them into a single transport stream S9, a modulator 9 for modulating the transport stream S9 in accordance with a predetermined modulation system, and a transmitting antenna 10 for transmitting the transmission signal S10 outputted from the modulator 9.

Not only the encoders 4 to 7 encodes and packets the video and audio of each program, but also the encoders generate additional information such as PSI and SI for each program and packets and outputs it. Therefore, the transport streams S5 to S8 which are outputted from the respective encoders 4 to 7 include not only TS packets of video and audio but also TS packets of PSI and SI.

By the way, if the transmitting device 2X has the structure shown in FIG. 5, the encoders 4 to 7 packet video and audio data for each program, and generate and packet PSI and SI for each program, so that PID value which is added to the TS packet and PSI and SI which are additional information may overlap in the multiplexed transport stream S9, or the program numbers written in the PSI and SI may overlap. If these troubles occur, the receiver side can not decode a program correctly, for instance, it can not seek PMT of a program instructed by an audience or it decodes a program different from the instructed program.

In the case of the transmitting device 2X, since the overlap occurs in the same device, if the encoders 4 to 7 can be set in advance so as not to multiplex the PID values, PSI, SI, and program numbers, the troubles can be avoided. However, in the case of a transmitting device which receives a transport stream multiplexed by another transmitting device 2 and then multiplexes a new different program onto the multiplexed transport stream, only the setting of the encoders can not avoid the troubles.

Figure 6:
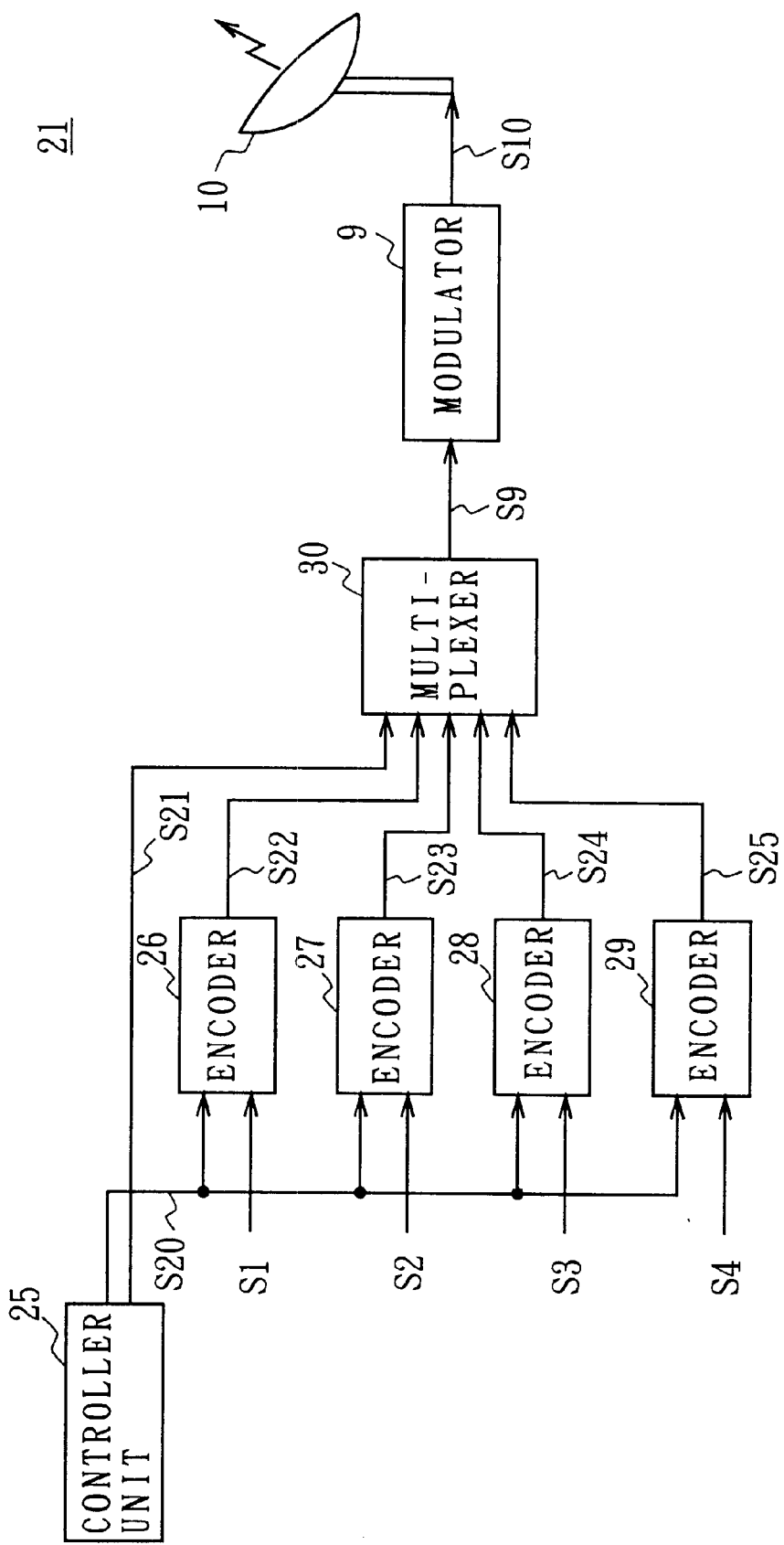
FIG. 6 is a block diagram showing the construction of a first transmitting device 21 of FIG. 4.

In order to solve such a problem, in the case of the embodiment in FIG. 4, as shown in FIG. 6 in which the same reference numerals are applied to parts corresponding to FIG. 5, the first transmitting device 21 is roughly comprised of a controller unit 25, encoders 26 to 29, a multiplexer 30, the modulator 9, and the transmission antenna 10. Relative to the transmitting device 2 shown in FIG. 5, the controller unit 25 is newly provided and the structures of the encoders 26 to 29 and the multiplexer 30 are changed.

The controller unit 25 is a control means for controlling the PID values of the TS packets and is an additional information generating means for generating additional information such as PSI and SI. At first, the controller unit 25 outputs a control signal S20 to the respective encoders 26 to 29 to assign PID values different from each other so that the PID values of TS packets to be generated at the respective encoders 26 to 29 do not overlap. For example, as shown in FIG. 7, the controller unit 25 uses the control signal S20 to instruct the encoder 26 to add "0X0100" PID to the video TS packet and to add "0X0101" PID to the audio TS packet. In addition, the controller unit 25 instructs the encoder 27 to add "0X0102" PID to the video TS packet and to add "0X0103" PID to the audio TS packet. Similarly, the controller unit 25 instructs the encoder 28 to add "0X0104" PID to the video TS packet and to add "0X0105" PID to the audio TS packet, and instructs the encoder 29 to add "0X0106" PID to the video TS packet and to add "0X107" PID to the audio TS packet. As a communication protocol for the control signal S20 to be outputted from the controller unit 25, for example, RS-232C or RS-422A are used.

Further, the controller unit 25 generates additional information such as PSI and SI on respective programs (S1 to S4) on the basis of the assigned PID values described above, and outputs a transport stream S21 obtained by packetting the generated PSI and SI, to the multiplexer 30. Specifically, the controller unit 25 previously knows the PID values of TS packets of the respective programs which are outputted from the encoder 26 to 29 because of assigning the encoders 26 to 29 to the PID values. The controller unit 25, on the basis of the PID values of respective programs, for example, generates PMT showing the PID values of TS packets where the video and audio data for constituting respective programs are stored and generates PAT showing the PID value of TS packet where the PMT is stored, and then packets and outputs the generated PMT and PAT in the packet structure shown in FIG. 1. Similarly, the controller unit 25 generates SI on the basis of PID values of respective programs, and packets and outputs the generated SI.

In this case, the controller unit 25 generates the PSI and SI by defining the video and audio data S1 treated at the encoder 26 as a program number "0X0001", the video and audio data S2 treated at the encoder 27 as a program number "0X0002", the video and audio data S3 treated at the encoder 28 as a program number "0X0003", and the video and audio data S4 treated at the encoder 29 as a program number "0X0004".

Figures 1, 2:
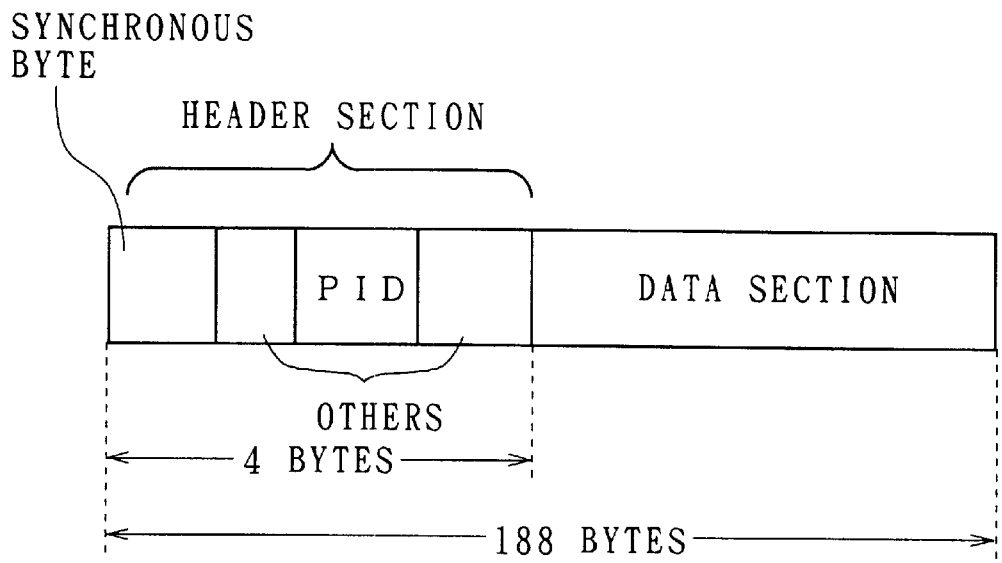
FIG. 1 is a schematic diagrams showing a packet structure of TS packet.
FIG. 2 is a table showing the relation between PID values and information to be stored.

Moreover, the controller unit 25, as shown in FIG. 2, adds the "0X0000" PID to the TS packet in which the PAT is stored and adds the PID, which does not overlap with that of video and audio, out of from "0X0010" to "0X1FFE" to the TS packet in which the PMT is stored. Similarly, the controller unit 25 adds PID, which does not overlap, shown in FIG. 2 to TS packet in which BAT, SDT, EIT, TDT, RST, ST, and the like consisting SI are stored.

The encoders 26 to 29 are a video and audio data encoding means for encoding the inputted video and voice data S1 to S4 of respective program in accordance with the MPEG2 system respectively and then packetting and outputting the encoded video and audio data for every fixed block in the packet structure shown in FIG. 1. In this case, each of the encoders 26 to 29 adds the PID to the TS packet based on the PID value instructed by the controller unit 25. Moreover, the encoders 26 to 29 only code and packet the video and audio data but do not generate PSI and SI. Thus, the transport streams S22 to S25 to be outputted from the encoders 26 to 29 respectively do not include TS packets of PSI and SI but only include video TS packet and audio TS packet which are element data.

The multiplexer 30 is a multiplexing means for multiplexing the transport streams S22 to S25 formed of video and audio TS packets which are supplied from the encoders 26 to 29 and the transport stream S21 formed of TS packets of PSI and SI which are supplied from the controller unit 25 in order to convert them into a single transport stream S9 and to output it to the modulator 9.

After the modulator 9 performs the QPSK modulation (quadrature phase shift keying) on the predetermined carrier wave on the basis of the inputted transport stream S9, the modulator 9 modulates the frequency of the carrier wave to the frequency bandwidth of satellite wave and outputs the resultant transmission signal S10. The transmission signal S10 outputted from the modulator 9 is supplied to the transmitting antenna 10 and then transmitted via the transmitting antenna 10.

Figure 8:
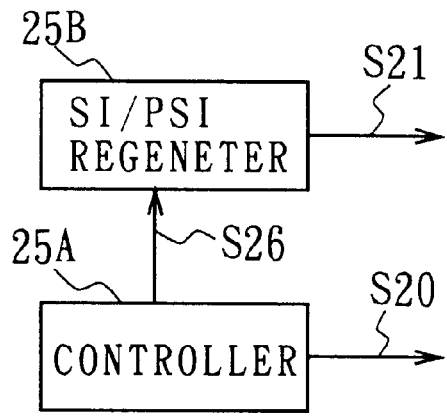
FIG. 8 is a block diagram showing the construction of a controller unit 25 of the first transmitting device 21.

At this point the controller unit 25 will be described in detail referring to FIG. 8. The controller 25 is comprised of a controller 25A and an SI/PSI generator 25B. The controller 25A is equivalent to a control means, and as described above, controls the PID values to be instructed the respective encoders 26 to 29 so as to assign PID values different from each other to the respective encoders 26 to 29 by outputting a control signal S20. Besides, the controller 25A outputs a control signal S26 to inform the SI/PSI generator 25B of the PID values assigned to the respective encoders 26 to 29.

The SI/PSI generator 25B is an additional information generating means, which knows the PID values assigned to the respective encoders 26 to 29 by the control signal S26 which is supplied from the controller 25A, and generates additional information such as PSI and SI on the basis of the PID values and converts them into TS packet to output the resultant transport stream S21 to the multiplexer 30. Note that, the SI/PSI generator 25B adds PID shown in FIG. 2 to the generated TS packet of PSI and SI in order to avoid the overlap of the PID values.

Figure 9:
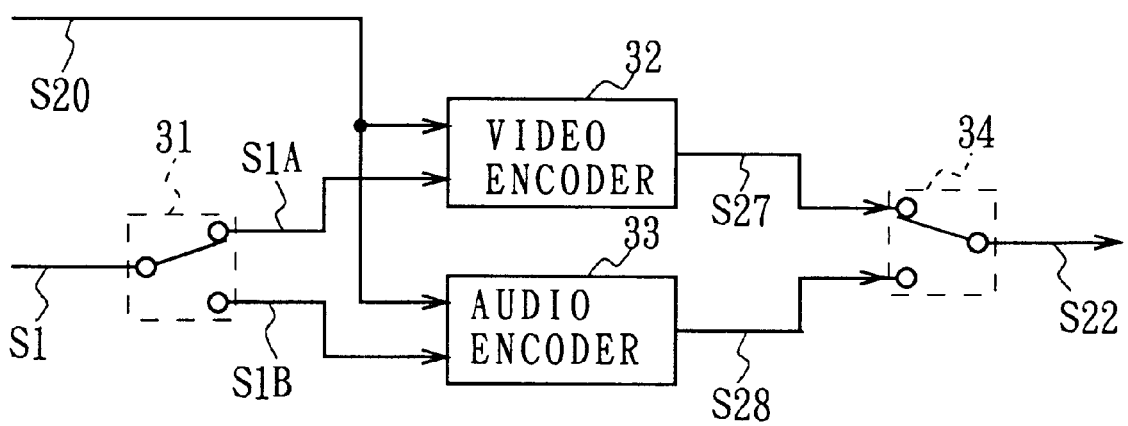
FIG. 9 is a block diagram showing the construction of encoders 26 to 29 of the first transmitting device 21 of FIG. 6.

Next, the encoders 26 to 29 will be described in detail referring to FIG. 9. However, since the constructions of the encoders 26 to 29 are the same, the encoder 26 will be described.

In the encoder 26, inputted video and audio data S1 is supplied firstly to a switch 31. The switch 31 supplies video data S1A out of the video and audio data S1 to a video encoder 32 and supplies audio data S1B to an audio encoder 33.

In the video encoder 32, the control signal S20 is inputted from the controller unit 25 for instructing so as to add the "0X0100" PID to the TS packet. The video encoder 32 successively encodes the inputted video data S1A in accordance with the MPEG2 system, packets the encoded video data for every fixed block in the packet structure shown in FIG. 1, and outputs the resultant transport stream S27. In this time, the video encoder 32 adds the "0X01000" PID to the generated video TS packet.

In the audio encoder 33, the control signal S20 is inputted from the controller unit 25 for instructing so as to add the "0X0101" PID to the TS packet. The audio encoder 33 successively encodes the inputted audio data S1B in accordance with the voice standard of the MPEG2 system, packets the encoded audio data for every fixed block in the packet structure shown in FIG. 1, and outputs the resultant transport stream S28. In this time, the audio encoder 33 adds the "0X0101" PID to the generated audio TS packet.

A switch 34 multiplexes the transport streams S27 and S28 respectively outputted from the video encoder 32 and the audio encoder 33 to convert them into a single transport stream S22, by switching at the predetermined timing.

In this connection, the video encoder 32 and the audio encoder 33 are controlled so as to sequentially output the respective transport streams S27 and S28 when connected to the switch 34. Thus, the transport streams S27 and S28 can be multiplexed without any information missing.

Figures 10, 12:
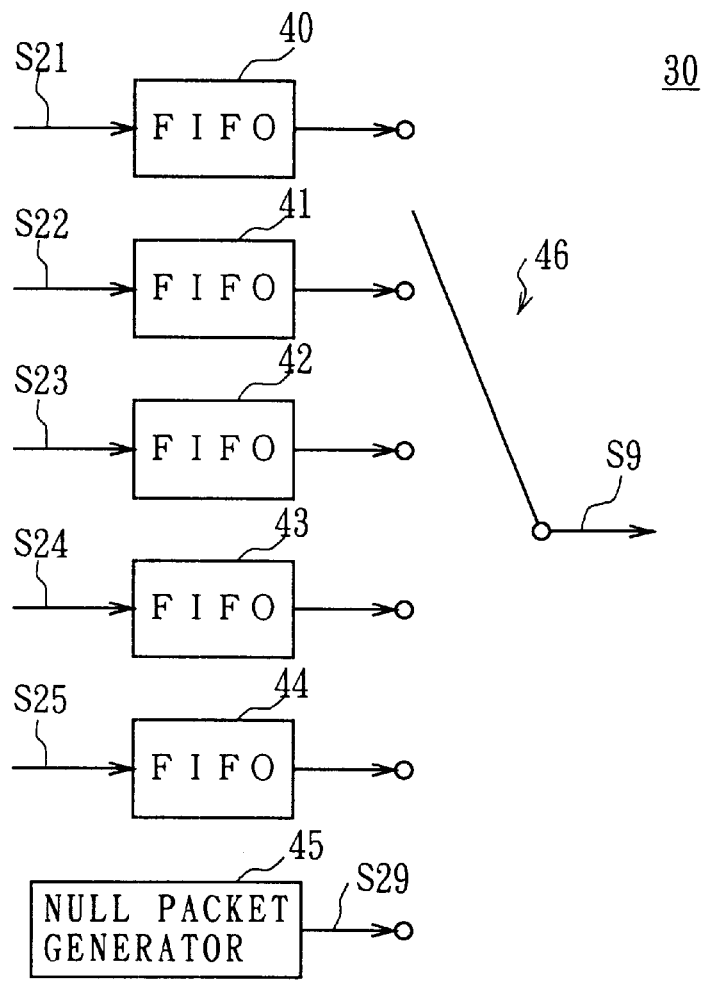
FIG. 10 is a block diagram showing the construction of a multiplexer 30 of the first transmitting device 21 of FIG. 6.
FIG. 12 is a table showing PID values which are assigned to respective encoder.

Next, the multiplexer 30 will be described in detail referring to FIG. 10. The multiplexer 30 is roughly comprised of buffering memories (FIFO) 40 to 44, a null packet generator 45, and a switch 46.

The transport stream S21 formed of TS packet of PSI and SI supplied from the controller unit 25 is inputted to the memory 40. The transport streams S22 to S25 formed of the video and voice TS packets respectively supplied from the encoders 26 to 29 are inputted to the memories 41 to 44 respectively.

The memories 40 to 44 temporarily store the transport streams S21 to S25 respectively to perform a buffering processing, and respectively output the transport streams S21 to S25 at the multiplexing timings of the latter stage of the switch 46. In this connection, since the memories 40 to 44 perform the buffering processing, the transport streams S21 to S25 can be multiplexed without any information missing.

The switch 46 multiplexes the transport streams S21 to S25 which are to be outputted from the respective memories 40 to 44 to convert them to a single transport stream S9, by switching at a predetermined timing.

In this connection, the null packet generator 45 is a circuit to generate null packets when any of the memories 40 to 44 is empty. The switch 46 selects the transport stream S29 formed of the null packets when any of the memories 40 to 44 is empty, in order to compensate for the shortage of transmission capacity.

In this way, in the first transmitting device 21, the encoders 26 to 29 encode and packet the video and audio data S1 to S4 of programs respectively, the controller unit 25 generates and packets additional information such as PSI and SI, and the multiplexer 30 multiplexes the transport streams S21 to S25 to output video and audio data of plural programs through one circuit. Further, in the first transmitting device 21, the controller unit 25 generates additional information such as PSI and SI in a lump, so that the overlap of additional information can be avoided.

Figure 11:
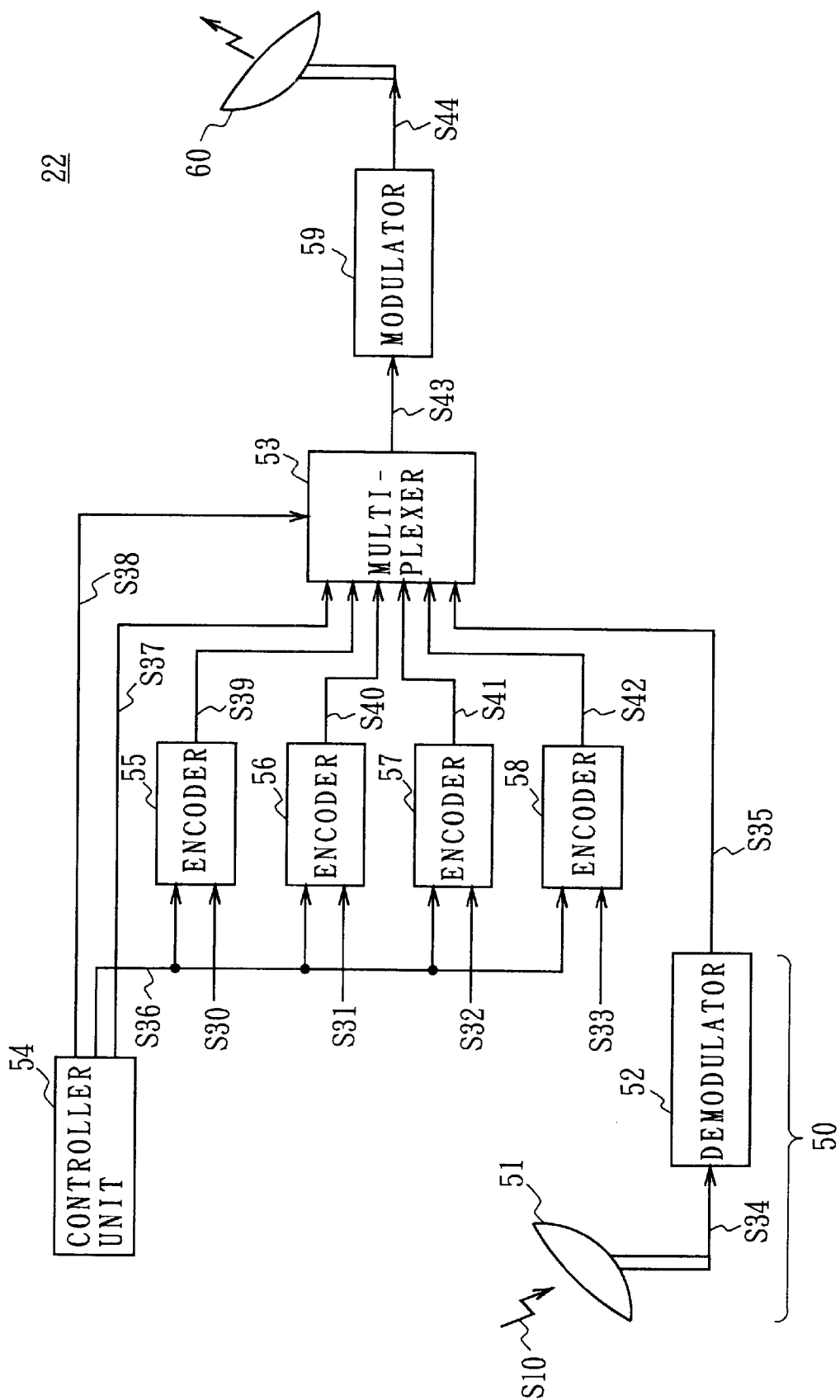
FIG. 11 is a block diagram showing a second transmitting device 22 of FIG. 4.

On the other hand, as shown in FIG. 11, the second transmitting device 22 has a receiving section 50 for receiving the transmitting signal S10 multiplexed by the first transmitting device 21, and is constructed so as to multiplex video and audio data S30 to S33 of new program onto the video and audio data obtained by the receiving section 50, so-called, has a path through channel construction.

First, the receiving antenna 51 receives the transmission signal S10 transmitted from the transmitting device 21 and supplies the resultant reception signal S34 to the demodulator 52. The demodulator 52 frequency-converts the reception signal S34 into a baseband signal, and then demodulates the baseband signal to restore the transport stream S35 corresponding to the transport stream S9 of the transmitter side, and outputs the transport stream S35 to the multiplexer 53.

The controller unit 54 is a control means to control PID values of TS packets similarly to the controller unit 25 of the first transmitting device 21 and an additional information generating means to generate additional information such as PSI and SI. At first, the controller unit 54 outputs the control signal S36 to the encoders 55 to 58 to assign PID values different from each other to the respective encoders 55 to 58 so that the PID values of TS packets generated at the encoders 55 to 58 do not overlap. For example, as shown in FIG. 12, the controller unit 54 uses the control signal S36 to instruct the encoder 55 to add "0X0100" PID to the video TS packet and "0X0101" PID to the audio TS packet. Besides, the controller unit 54 instructs the encoder 56 to add "0X0102" PID to the video TS packet and "0X0103" PID to the audio TS packet. Similarly, the controller unit 54 instructs the encoder 57 to add "0X0104" PID to the video TS packet and "0X0105" PID to the audio TS packet, and instructs the encoder 58 to add "0X0106" PID to the video TS packet and "0X0107" PID to the audio TS packet. In this connection, this case also uses, for example, RS-232C or RS-422A, as a communication protocol for the control signal S36.

Further, the controller unit 54 generates additional information such as PSI and SI on programs (S30 to S33) to be newly multiplexed, on the basis of the assigned PID values described above, and then outputs the transport stream S37 obtained by packetting the generated PSI and SI to the multiplexer 53. Specifically, since the controller unit 54 assigns the PID values to the encoders 55 to 58, the controller unit 54 knows the PID values of the TS packets of respective programs to be outputted from the encoders 55 to 58 in advance. The controller unit 54, on the basis of the PID value of each of the programs, generates PMT showing the PID values of TS packets in which video and audio data consisting each program are stored and generates PAT showing the PID value of TS packet in which the PMT is stored, and then packets and outputs the generated PMT and PAT in the packet structure shown in FIG. 1. Similarly, the controller unit 54 generates SI on the basis of the PID value of each program, and packets and outputs the generated SI.

In this time, the controller unit 54 generates PSI and SI, assuming that the video and audio data S30 to be treated by the encoder 55 is the program number "0X0001", the video and audio data S31 to be treated by the encoder 56 is the program number "0X0002", the video and audio data S32 to be treated by the encoder 57 is the program number "0X0003", and the video and audio data S33 to be treated is the program number "0X0004".

In addition, as shown in FIG. 2, the controller unit 54 adds the "0X0000" PID to the TS packet where PAT is stored, and adds the PID, which does not overlap with the video and audio, out of "0X0020" to "0X1FFE" to the TS packet where PMT is stored. Similarly, the controller unit 54 adds PID shown in FIG. 2, which does not overlap, to the TS packet where BAT, SDT, EIT, TDT, RST, ST, and the like, constituting SI are stored.

Further, the controller unit 54 outputs the control signal S38 to the multiplexer 53 in order to instruct the multiplexer 53 to extract the video and audio data of a desired program from the received transport stream S53 and in order to instruct the regenerating of PSI and SI and the modification of the PID value described later. In this connection, RS-232C, RS-422A or the like is used as a communication protocol for the control signal S38.

The encoders 55 to 58 are encoding means for video and audio data, where the inputted video and audio data S30 to S33 of respective programs are respectively encoded in accordance with MPEG2 and the encoded video and audio data are packetted and outputted for every fixed block in the packet structure shown in FIG. 1. In this time, each of the encoders 55 to 58 adds PID to TS packet based on the PID value instructed from the controller unit 54. Further, the encoders 55 to 58 only encode and packet the video and audio data and do not generate PSI and SI. Therefore, the transport streams S39 to S42 respectively outputted from the encoders 55 to 58 do not include TS packet of PSI and SI but include only the video TS packet and the audio TS packet which are element data.

The multiplexer 53 is a multiplexing means for multiplexing the transport streams S39 to S42 which are composed of the TS packets of video and audio and are respectively supplied from the encoders 55 to 58, the transport stream S37 which is composed of TS packet of PSI and SI and are supplied from the controller unit 54, a transport stream (hereinafter, in this embodiment, the transport streams S22, S23 in FIG. 6 are extracted) of a desired program out of transport streams received by the receiving device 50, and a transport stream (transport stream S21 in FIG. 6) of PSI and SI out of transport streams S35, in order to convert them into a single transport stream S43.

By the way, if these transport streams are simply multiplexed by the multiplexer 53, the PID values overlap and the PSI and SI generated by the first transmitting device 21 and PSI and SI generated by the controller unit 54 overlap because the same PID values are added at the encoder 26 of the first transmitting device 21 and the encoder 55 of the second transmitting device 22, and the encoder 27 of the first transmitting device 21 and the encoder 56 of the second transmitting device 22. Therefore, in the multiplexer 53, the overlap of the PID value can be avoided by adding a different PID value to TS packet of transport stream generated by the first transmitting device 21, and the overlap of the additional information such as PSI and SI can be avoided by combining the PSI and SI generated by the first transmitting device 21 and the PSI and SI generated by the controller unit 54 to reform.

In this way, the transport stream S43 in which the overlap of the PID values and the overlap of the additional information are avoided is supplied to the modulator 59. The modulator 59 performs, for example, the QPSK modulation on a predetermined carrier waves based on the transport stream S43, and then converts the frequency of the carrier waves into frequency bandwidth of the satellite waves, and outputs the resultant transmission signal S44. The transmission signal S44 outputted from the modulator 59 is supplied to the transmitting antenna 60 and then is transmitted through the transmitting antenna 60.

Figure 13:
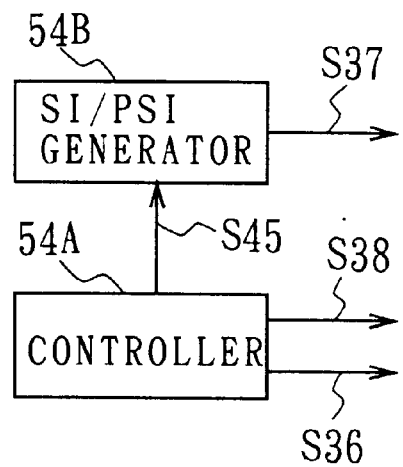
FIG. 13 is a block diagram showing the construction of a controller unit 54 of the second transmitting device 22 of FIG. 11.

Here, the aforementioned controller unit 54 will be specifically described referring to FIG. 13. The controller unit 54 has almost a similar construction with the controller unit 25 of the first transmitting device 21, and is roughly composed of a controller 54A and an SI/PSI generator 54B. The controller 54A is a control means for controlling the PID values to be instructed to the respective encoders 55 to 58, to assign PID values different from each other to the respective encoders 55 to 58 by outputting the control signal S36. In addition, the controller 54A outputs the control signal S45 to inform the SI/PSI generator 54B of the PID values assigned to the respective encoders 55 to 58. In addition, the controller 54A controls the operation of the multiplexer 54 as described above, and outputs the control signal S38 in order to instruct the multiplexer 53 to extract a transport stream of a desired program from the received transport stream S35, of regenerating the PSI and SI, and of modifying the PID value.

The SI/PSI generator 54B is an additional information generating means, knows the PID values assigned to the respective encoders 55 to 58 by the control signal S45 supplied from the controller 54A, generates the SI and PSI on the respective programs (S30 to S33) based on the PID values, and then converts these into TS packets, and outputs the resultant transport stream S37. Note that, the SI/PSI generator 54B adds PID shown in FIG. 12 to the generated TS packets of PSI and SI to avoid the overlap of PID values.

Figure 14:
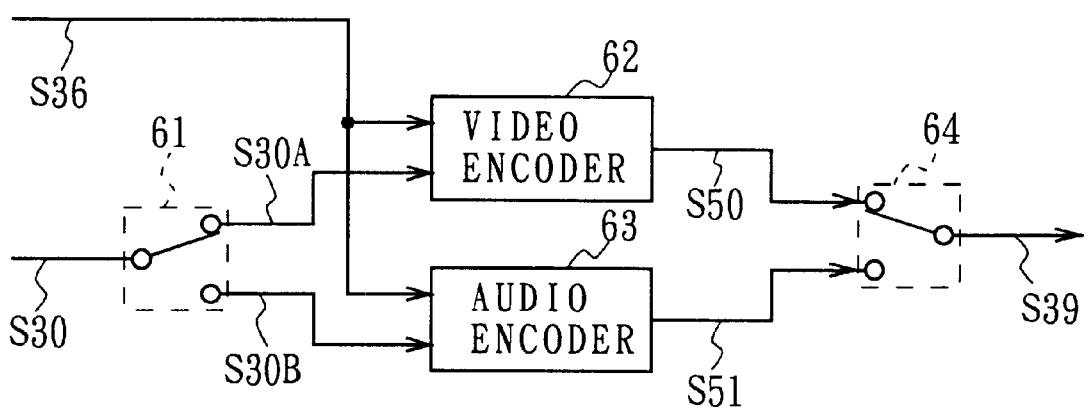
FIG. 14 is a block diagram showing encoders 55 to 58 of the second transmitting device 22 of FIG. 11.

Next, the encoders 55 to 58 will be specifically described referring to FIG. 14. As shown in FIG. 14, the encoders 55 to 58 have a similar construction with the encoders 26 to 29 of the first transmitting device 21, and each is roughly composed of switches 61, 64, a video encoder 62, and an audio encoder 63. Hereinafter, the constructions of the encoders 26 to 29 are the same, the encoder 55 will be described.

In the encoder 55, at first the inputted video and audio data S30 is inputted to the switch 61. The switch 61 supplies the video data S30A out of the video and audio data S30 to the video encoder 62, and supplies the audio data S30B to the audio encoder 63.

The video encoder 62 sequentially encodes the inputted video data S30A in accordance with the MPEG2 system, and then packets the encoded video data for every fixed block in the packet structure shown in FIG. 1 and outputs a resultant transport stream S50. In this time, the video encoder 62 adds "0X0100" PID to the video TS packet based on the control signal S36 from the controller unit 54.

The audio encoder 63 sequentially encodes the inputted audio data S30B in accordance with the audio standard system of MPEG2, and then packets the encoded audio data for every fixed block in the packet structure shown in FIG. 1 and outputs a resultant transport stream S51. In this time, the audio encoder 63 adds "0X0101" PID to the audio TS packet based on the control signal S36 from the controller unit 54.

The switch 64 multiplexes the transport streams S50 and S51 respectively outputted from the video encoder 62 and the audio encoder 63 by switching at a predetermined timing, in order to convert them into a single transport stream S39.

In this connection, the video encoder 62 and the audio encoder 63 are controlled so as to output the respective transport streams S50, S51 when the switch 64 is connected. Thereby, the transport streams S50 and S51 can be multiplexed without the lack of information.

Figure 15:
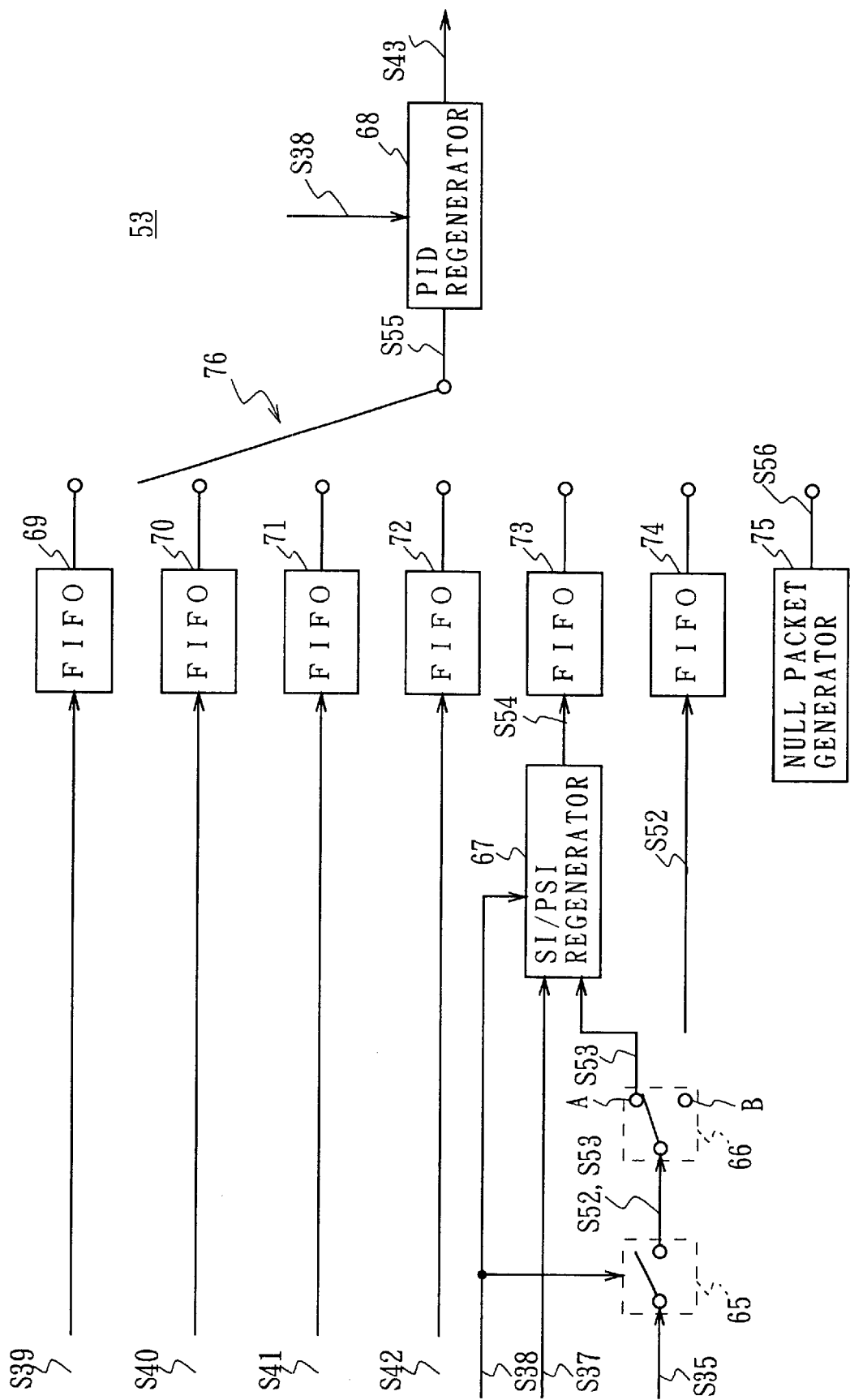
FIG. 15 is a block diagram showing the construction of a multiplexer 53 of the second transmitting device 22 of FIG. 11.

Next, the multiplexer 53 will be described in detail with reference to FIG. 15. The multiplexer 53 has a structure where switches 65 and 66, an SI/PSI regenerator 67, and a PID regenerator 68 are newly added to the multiplexer 30 of the first transmitting device 21, and is roughly composed of buffering memories (FIFO) 69 to 74, a null packet generator 75, switches 65, 66 and 76, an SI/PSI regenerator 67, and a PID regenerator 68.

In the memories 69 to 72, the transport streams S39 to S42 are respectively inputted from the encoders 55 to 58. The memories 69 to 72 temporarily store the respectively inputted transport streams S39 to S42 to perform the buffering-processing, and then outputs them at a multiplexing timing of the latter stage of the switch 76.

On the contrary, the transport stream S35 from the receiving section 50 is first inputted to the switch 65. The switch 65 is provided as a signal extracting means for performing a switching operation based on the control signal S38 from the controller unit 54 to extract the transport stream S52 of a program instructed from the controller unit 54 and the transport stream S53 of PSI and SI. Specifically, the switch 65 extracts the transport streams S52 and S53 by turning into an ON state at a timing of the TS packets of video and audio consisting the instructed program and the TS packets of PSI and SI.

The transport streams S52 and S53 extracted by the switch 65 are inputted to the following switch 66 to be separated, so-called, to be demultiplexed. The switch 66 is provided as a signal separating means, for separating the transport stream S52 and the transport stream S53 by switching to the output terminal A side when the transport stream S53 is inputted and switching to the output terminal B side when the transport stream S52 is inputted. In this way, the switch 66 performs the separating operation, and then supplies the resultant transport stream S53 being system data such as PSI and SI to the latter stage of the SI/PSI regenerator 67 and supplies the resultant transport stream S52 of element data such as video and audio to the memory 74.

The memory 74 temporarily stores the inputted transport stream S52 to execute the buffering processing, and outputs the transport stream S52 at a multiplexing timing of the latter stage of switch 76.

On the other hand, in the SI/PSI regenerator 67, the transport stream S37 consisting of PSI and SI generated by the controller unit 54 is inputted other than the transport stream S53 separated by the switch 66. The SI/PSI regenerator 67 combines these streams to generates PSI and SI combined into a single, and thereby generates PSI and SI matching to the multiplexed transport steam S43.

Specifically, if the transport stream S53 of the extracted PSI and SI is multiplexed as it is, it overlaps to the transport stream S37 of the PSI and SI generated by the controller unit 54, so that the receiver side might not know that any of PSI and SI should be referred. In addition, since the extracted PSI and SI include information on a program not extracted, if the transport stream S53 is multiplexed as it is, the additional information on the program not to be transmitted is transmitted, so that extra information is transmitted. Further, since the PID value of the TS packet in the received transport stream S52 overlaps to that in the transport streams S39 to S42 generated in the second transmitting device 22, the PID value is modified by the PID regenerator 68 as described later. Therefore, the PID values written in the PSI and SI do not match to the real value, so that inconvenience occurs.

Therefore, the SI/PSI regenerator 67 combines the extracted PSI and SI with the PSI and SI generated by the controller unit 54 for the regeneration, thereby these problems are avoided.

This point will be explained more concretely below. In the case of combining the extracted PSI and SI with the PSI and SI generated by the controller unit 54, the program number and the PID value are considered as things of which contents need to be modified. The modification is controlled by the controller unit 54, and the SI/PSI generator 67 receives the modification instruction by the control signal S38 from the controller unit 54.

For example, if the transport streams S22 and S23 generated by the encoders 26 and 27 of the first transmitting device 21 are extracted as the transport stream S52, as shown in FIGS. 16 and 17, the PID values and the program numbers of the transport streams S22 and S23 generated by the encoders 26 and 27 respectively overlap to the PID values and the program numbers of the transport streams S39 and S40 generated by the encoders 55 and 56. Therefore, the controller unit 54 instructs to modify the PID values and the program numbers. Specifically, the controller unit 54 instructs to modify the PID value of the video TS packet and the PID value of the audio TS packet out of the transport stream S22 generated by the encoder 26 as "0X0108" and "0X0109" respectively, and instructs to modify the PID value of the video TS packet and the PID value of the audio TS packet out of the transport stream S23 generated by the encoder 27 as "0X010A" and "0X010B" respectively (in this connection, these instructions are also supplied to the PID regenerator 68 to modify the PID values added to the TS packets by the PID regenerator 68 as described later). In addition, the controller unit 54 instructs to modify the program number of the transport stream S22 generated by the encoder 26 as "0X0005" and the program number of the transport stream S23 generated by the encoder 27 as "0X0006".

In case where the SI/PSI regenerator 67 combines the extracted PSI and SI (S53) with the PSI and SI (S37) generated by the controller unit 54 for the regeneration, the PID values and the program numbers written in the PSI and SI are modified based on the aforementioned instructions from the controller unit 54. For example, the program number and the PID value written in the PMT on the extracted transport stream S52 are modified, and the PID value and the program number on the transport stream S52 in the PAT are modified. In this case, the parts on the program not extracted are deleted. In this way, the program numbers and the PID values are modified and unnecessary parts are deleted to combine the PSI and SI into a single, thereby the overlap of the PSI and SI can be avoided and the overlap of the PID values can be avoided, and further, the transmission of unnecessary information can be avoided.

In this way, the transport stream S54 of the PSI and SI generated so as to match to the multiplexed transport stream S43 is inputted to the memory 73. The memory 73 temporarily stores the inputted transport stream S54 to perform the buffering processing, and outputs the transport stream S54 at a multiplexing timing of the latter stage of the switch 76.

The switch 76 switches at a predetermined timing, thereby the transport streams S39 to S42, S54, and S52 outputted from the respective memories 69 to 74 are converted into a single transport stream S55 by being multiplexed.

In this connection, the null packet generator 75 is a circuit for generating null packets when any of the memories 69 to 74 is empty. The switch 76 selects the transport stream S56 consisting of null packets when each of the memories 69 to 74 is empty, in order to supply the lack of transmission capacity.

The transport stream S55 multiplexed by the switch 76 as described above is inputted to the PID regenerator 68 provided as a packet identifier modifying means. The PID regenerator 68 inputs the control signal S38 from the controller unit 54 and receives the modifying instructions of the PID values as described above by the control signal S38. The PID regenerator 68 modifies the PID values of the corresponding TS packets out of the transport stream S55 on the basis of the instructions. For example, in the case where the transport streams S22 and S23 respectively generated by the encoders 26 and 27 of the first transmitting device 21 are extracted as the transport stream S52, as shown in FIG. 12, the PID value of the video TS packet of the transport stream S22 is modified as "0X0108", the PID value of the audio TS packet is modified as "0X0109", the PID value of the video TS packet out of the transport stream S23 is modified as "0X010A", and the PID value of the audio TS packet is modified as "0X010B". Note that, in the case where the PID value of PMT on the transport stream S52 overlaps to PID value of PMT on the transport streams S39 to S42, the PID value is also modified so as not to overlap. In this case, the SI/PSI regenerator 67 also modifies the PID value of the parts.

The transport stream S43 of which the PID value is modified by the PID regenerator 68 as described above is supplied to the modulator 59 as described above, and is converted into the transmission signal S44 to be transmitted.

Figure 18:
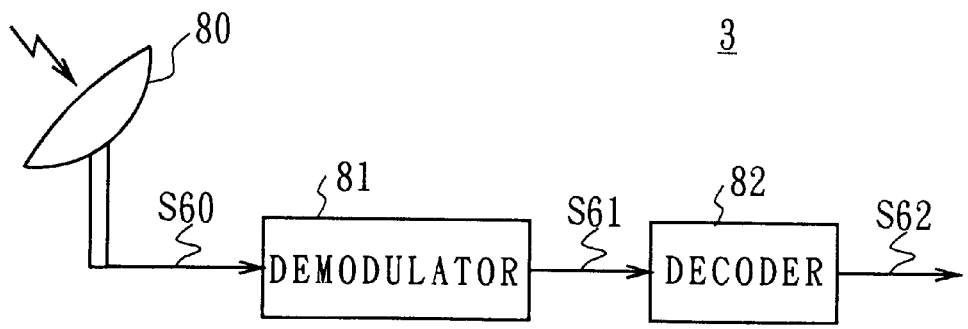
FIG. 18 is a block diagram showing the construction of a receiving device 3 of FIG. 4.

Next, the receiving device 3 will be described with reference to FIG. 18. The receiving device 3 is composed of the receiving antenna 80, the demodulator 81, and the decoder 82, where the reception signal S60 received by the receiving antenna 80 is inputted to the demodulator 81.

The demodulator 81 frequency-converts the reception signal S60 into a baseband signal, and then restores the transport stream S61 corresponding to the transport stream S9 or S43 of the transmitter side by demodulating the baseband signal, and outputs the transport stream S61 to the decoder 82.

The decoder 82 is a decoding means, in which the video TS packet and the audio TS packet constituting the program instructed by the audience are extracted from the transport stream S61 in accordance with the instruction of the audience inputted from an instructing section not shown and are decoded in order to reproduce the video and audio data S62. In this case, the decoder 82 performs a decoding processing based on PSI being additional information on the program. Specifically, the decoder 82 first extracts the TS packet in which PAT is stored to obtain PAT, and next extracts the TS packet in which PMT of the instructed program is stored with reference to the PAT. Then, the PID values of TS packets of the video and audio constituting the instructed program is examined with reference to the obtained PMT to extract the TS packet constituting the program based on the examination result.

Thus reproduced video and audio data S62 is supplied, for example, to the television device or the like to be televised.

In the aforementioned configuration, the transmitting device 22 according to this embodiment receives the transport stream S35 multiplexed by the first transmitting device 21, and multiplexes the transport streams S39 to S42 of the new program onto the transport stream S35 to transmit it. In this time, in the transmitting device 22, the switch 65 in the multiplexer 53 extracts the TS packet (S52) of the video and audio constituting the desired program from the transport stream S35, and extracts the TS packet (S53) of PSI and SI being additional information on the program. The following switch 66 separates the extracted TS packets (S52, S53), to supply the TS packet (S52) of the video and audio to the memory 74 and the TS packet (S53) of PSI and SI to the SI/PSI regenerator 67.

In the SI/PSI regenerator 67, the TS packet (S37) of PSI and SI generated for the transport streams S39 to S42 to be newly multiplexed is inputted. And, the SI/PSI regenerator 67 combines the TS packet (S37) of the PSI and SI and the TS packet (S53) of PSI and SI extracted from the transport stream S35 to reform them into one, thereby generates the PSI and SI matching to the multiplexed transport stream S43. Thereby, the transmitting device 22 can easily avoid overlap of the PSI, SI generated by the transmitting device 21 and the PSI, SI generated in the transmitting device 22 with a simple construction. In addition, the SI/PSI regenerator 67 modifies the PID values written in PSI and SI as values shown in FIG. 16 according to the modification of the PID values at the latter stage of the PID regenerator 68, and modifies the overlapped program number, for example, as the number shown in FIG. 17. Thereby, the overlap of PID values and program numbers written in the PSI and SI can be avoided, and the receiving device 3 can previously avoid decoding a wrong program.

Thus regenerated TS packet (S54) of the PSI and SI is temporarily stored in the memory 73, and then is multiplexed along with the transport stream S52 and the transport streams S39 to S42 to be converted into a single transport stream S55 by the switch 76. The transport stream S55 is inputted to the PID regenerator 68 where the multiplexed PID value is modified. specifically, the PID value of the transport stream S52 generated by the first transmitting device 21 is modified so as to be different from the PID values of the transport streams S39 to S42 to be newly multiplexed. Thereby, the transmitting device 22 can easily avoid the overlap of PID values between the transport stream S52 generated by the first transmitting device 21 and the transport streams S39 to S42 to be newly multiplexed with a simple construction, so that the receiving device 3 can previously avoid decoding a wrong program.

In this way, in the transmitting device 22, in the case where the new transport streams S39 to S42 are multiplexed onto the transport stream S35 generated by the first transmitting device 21, the transport stream S53 of PSI and SI is separated from the transport stream S35, and the transport stream S53 of the PSI and SI are combined with the transport stream S37 of PSI and SI generated at the transmitting device 22 by the SI/PSI regenerator 67 for regeneration, in order to convert them into a single transport stream S54. Thereby, the overlap of the PSI and SI generated by the transmitting device 21 and the PSI and SI generated by the transmitting device 22 can be easily avoided with a simple construction.

Further, in the transmitting device 22, the PID regenerator 68 modifies the PID value added to the transport stream S52 generated by the first transmitting device 21 as a value different from the PID values of the transport streams S39 to S42 to be newly multiplexed. Thereby, the overlap of the PID values in the multiplexed transport stream S55 can be easily avoided with a simple construction.

According to the aforementioned configuration, in the case where the new transport streams S39 to S42 are multiplexed onto the transport stream S35 generated by the first transmitting device 21, the transport stream S53 of PSI and SI is separated from the transport stream S35 and the transport stream S53 of the PSI and SI are combined with the transport stream S37 of PSI and SI generated by the transmitting device 22 by the SI/PSI regenerator 67 for the regeneration, so that the overlap of additional information such as PSI and SI can be easily avoided with a simple construction.

In addition, the PID regenerator 68 is provided for modifying the PID value added to the transport stream S52 generated by the first transmitting device 21 as a value different from the PID values of the transport streams S39 to S42 to be newly multiplexed and thereby, the overlap of the PID values can be easily avoided with a simple construction.

Since the overlap of additional information and the overlap of PID values can be avoided, even the case of multiplexing the new packet line onto the packet line multiplexed by other transmitting device 21, the transmitting device 22 capable of multiplexing without troublesome can be realized.

Figure 19:
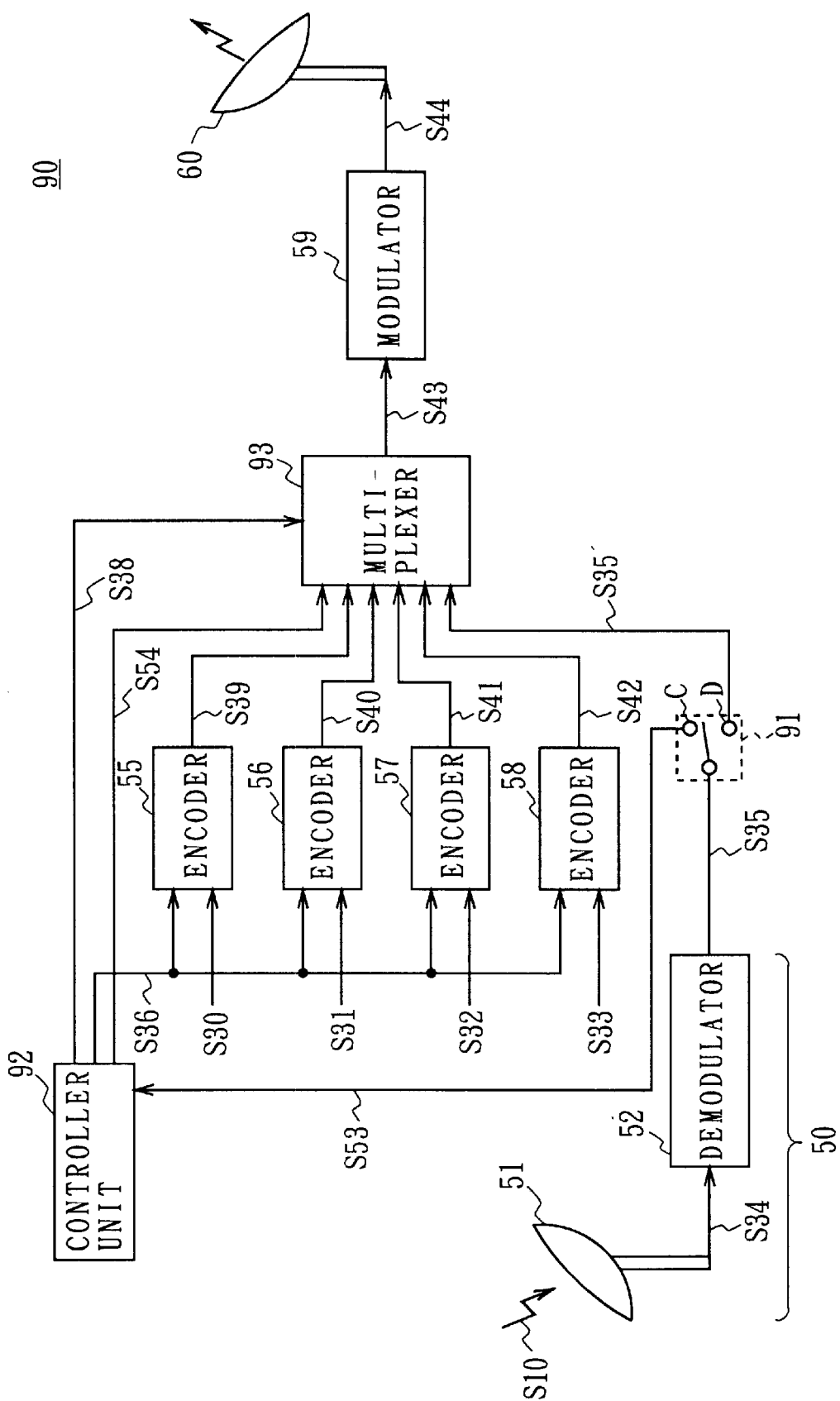
FIG. 19 is a block diagram showing the construction of a second transmitting device 90 according to another embodiment.

Note that, in the aforementioned embodiment, the switch 66 of the multiplexer 53 separates the transport stream S53 of PSI and SI, and then the SI/PSI regenerator 67 reforms the transport stream S53 of the PSI and SI and the transport stream S37 of PSI and SI generated by the controller unit 54 to combine the PSI and SI into one. However, the present invention is not limited thereto and, as shown in FIG. 19 in which the same reference numerals are applied to parts corresponding to FIG. 11, the switch 91 may separate the transport stream S53 of PSI and SI from the transport stream S35, and the controller unit 92 may generate the PSI and SI combined into one based on the transport stream S53.

Specifically, the received transport stream S35 is inputted to the switch 91. The switch 91 is provided as a signal separating means, which switches to the terminal C side when the transport stream S35 is the TS packets of PSI and SI and switches to the terminal D side when the transport stream S35 is the TS packets of video and audio, thereby the transport stream S35 is separated into the transport stream S35' of video and audio being the element data and the transport stream S53 of PSI and SI being additional information on the element data. The separated transport stream S53 of PSI and SI is inputted to the controller unit 92 being an additional information generating means. The controller unit 92 generates PSI and SI on the respective programs (S30 to S33) based on the PID values assigned to the respective encoders 55 to 58 and generates new PSI and SI by combining the inputted PSI and SI with the generated PSI and SI, in order to output the transport stream S54 obtained by packetting the new PSI and SI to the multiplexer 93.

Figure 20:
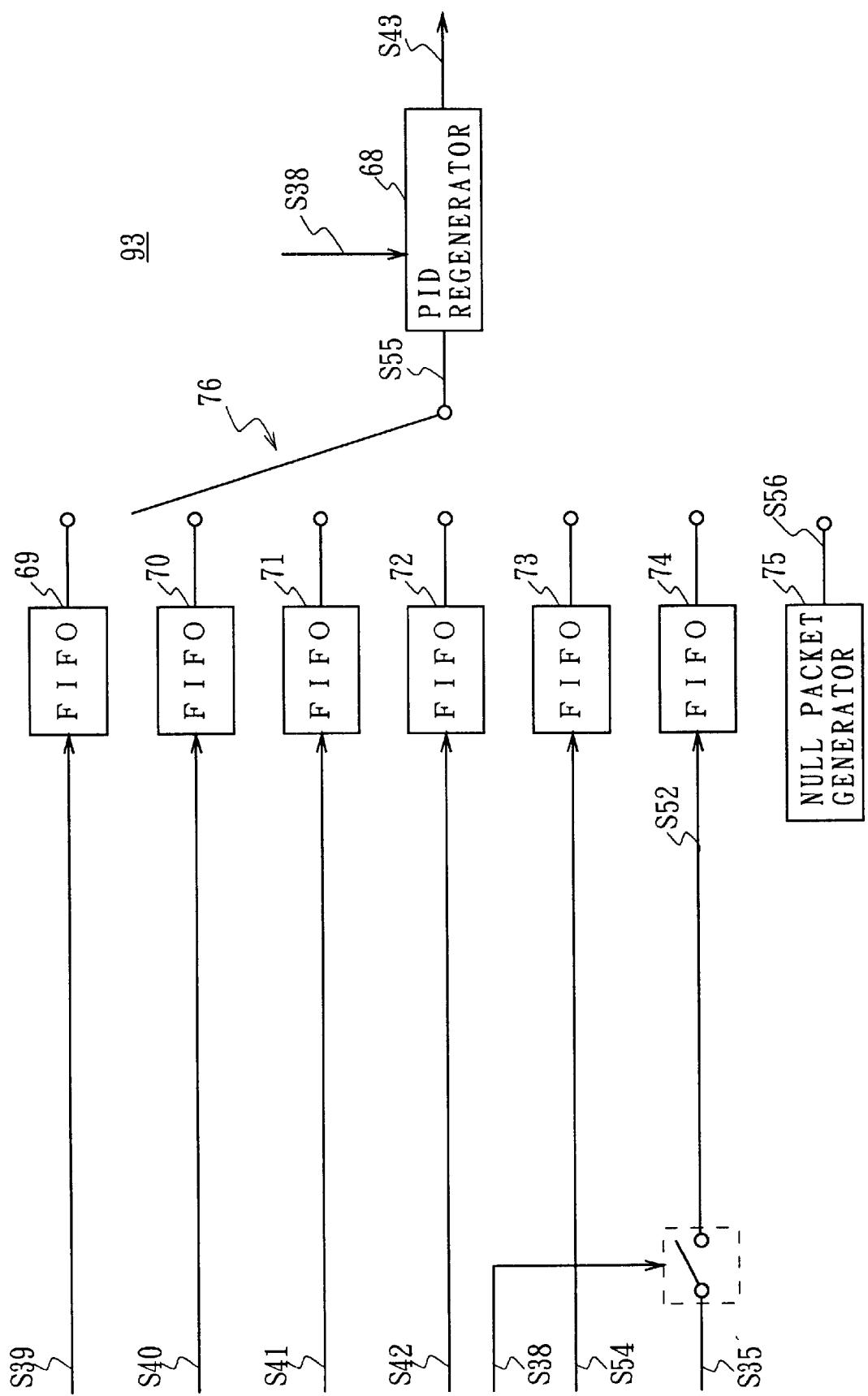
FIG. 20 is a block diagram showing the construction of a multiplexer 93 of the second transmitting device 90 of FIG. 19.

In this way, as shown in FIG. 20, the multiplexer 93 may only multiplex the inputted transport streams S39 to S42 and S35' of video and audio and the transport stream S54 of PSI and SI, and in addition, the construction of the multiplexer 93 can be simplified because of unnecessary of the SI/PSI regenerator 67, thus the configuration of the transmitting device can be further simplified as a whole.

In this connection, the controller unit 92 has a construction almost similar to the controller unit 54 shown in FIG. 13, in which the separated transport stream S53 of PSI and SI may be supplied to the SI/PSI generator to generate PSI and SI combined into one.

Further, in the aforementioned embodiment, the transport streams S9 and S43 are transmitted by the transmitting devices 21 and 22 in utilizing a satellite wave. However, the present invention is not limited thereto and the transport streams S9 and S43 may be transmitted in utilizing a ground wave, a predetermined wire cable, or a predetermined public net. In short, the transport streams S9, S43 may be transmitted to a predetermined transmitting line.

Further, in the aforementioned embodiment, the QPSK modulation is utilized as a modulating method of the modulators 9 and 59. However, the present invention is not limited thereto and, for example, the QAM modulation (Quadrature Amplitude Modulation) or the OFDM modulation (Orthogonal Frequency Division Multiplex) may be utilized as the modulating method of the modulators 9 and 59.

Further, the aforementioned embodiment has dealt with the case where the inputted four pieces of video and audio data S30 to S33 are multiplexed onto the received transport stream S35, that is, the case of four channel multiplex. However, the present invention is not limited thereto and, for example, the six channel multiplex or the eight channel multiplex may be utilized, in short, the number of channel is not limited.

Further, the aforementioned embodiment has dealt with the case where the transport streams S22 and S23 generated at the encoders 26 and 27 of the first transmitting device 21 are extracted as the transport stream S52. However, the present invention is not limited thereto and, for example, the transport stream S24 and S25 generated at the encoder 28 and 29 of the first transmitting device 21 may be extracted.

Further, the aforementioned embodiment has dealt with the case of providing the null packet generators 45 and 75 in the multiplexers 30 and 53. However, the present invention is not limited thereto and, for example, in the case of controlling data volume of video and audio data S1 to S4 or S30 to S33 which is previously inputted so as not to lack the transmission capacity in multiplexing, the null packet generator may not provided in the multiplexer.

Further, the aforementioned embodiment has dealt with the case of modifying the PID value of the transport stream S52 generated at the first transmitting device 21. However, the present invention limited thereto and the PID values of the transport streams S39 to S42 generated at the second transmitting device 22 may be modified. In short, the overlap of the PID values can be avoided if the PID values are modified so that the PID value added to TS packet generated at another transmitting device is different from the PID values of TS packets generated at the encoders 55 to 58 of the transmitting device 22.

Further, the aforementioned embodiment has dealt with the case of multiplexing the inputted plurality of video and audio data. However, the present invention is not limited thereto and, for example, only inputted plurality of video data may be multiplexed, or only input plurality of audio data may be multiplexed.

Further, the aforementioned embodiment has dealt with the case of regenerating PSI and SI being additional information on a program by the SI/PSI regenerator 67. However, the present invention is not limited thereto and additional information on packetted input data and additional information on element data multiplexed by another transmitting device may be regenerated by the additional information regenerating means. In addition, corresponding to the aforementioned example of deformation, additional information generated by adding additional information on the packetted input data and additional information on element data multiplexed by another transmitting device may be previously generated by the additional information generating means.

Further, the aforementioned embodiment has dealt with the case where the present invention is applied to the transmitting device 22 for multiplexing and transmitting video and audio data. However, the present invention is not limited thereto and the present invention can be applied widely as long as the transmitting device multiplexes and transmits an inputted plurality of input data and data generated by another transmitting device.

As described above, according to the present invention, a packet line multiplexed by another transmitting device is separated into a packet line of element data and a packet line of second additional information on the element data, and third additional information collected into one is generated by combining the second additional information and the first additional information for regeneration, thereby the overlap of additional information can be avoided with a simple construction. Thus, even the case where the new generated packet line is multiplexed onto a packet line multiplexed by another transmitting device, the transmitting device capable of multiplexing without troublesome can be realized.

Furthermore, in the present invention, a packet line multiplexed by another transmitting device is separated into a packet line of element data and a packet line of first additional information on the element data, and third additional information is generated by adding the first additional information to the second additional information on packetted input data, thereby the overlap of additional information can be avoided without regenerating additional information. Thus, even the case where a newly generated packet line is multiplexed onto a packet line multiplexed by another transmitting device, the transmitting device capable of multiplexing without troublesome can be realized.

(2) Second Embodiment

Figure 21:
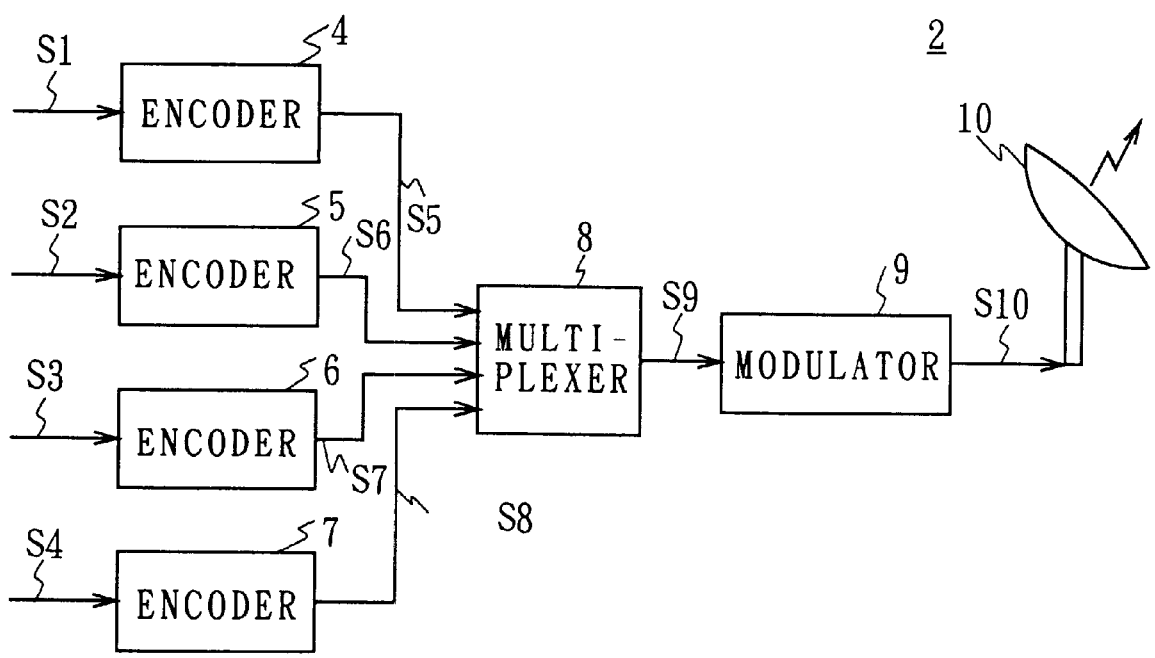
FIG. 21 is a block diagram showing the construction of the transmitting device 2 of FIG. 3.

In the case of generally considering the structure shown in FIG. 3 as a digital broadcasting system for multiplexing packets and transmitting information, the structure shown in FIG. 21 can be adopted as a transmitting device. That is, as shown in FIG. 21, a transmitting device 2 is composed of encoders 4 to 7 for encoding inputted video and audio data S1 to S4 of respective programs in accordance with the MPEG2 system and packetting and outputting the encoded data for every fixed block, a multiplexer 8 for multiplexing transport streams S5 to S8 outputted from the respective encoders 4 to 7 to convert them into a single transport stream S9, a modulator 9 for modulating the transport stream S9 in accordance with a predetermined modulating system, and a transmitting antenna 10 for transmitting a transmission signal S10 outputted from the modulator 9.

Figures 22, 24:
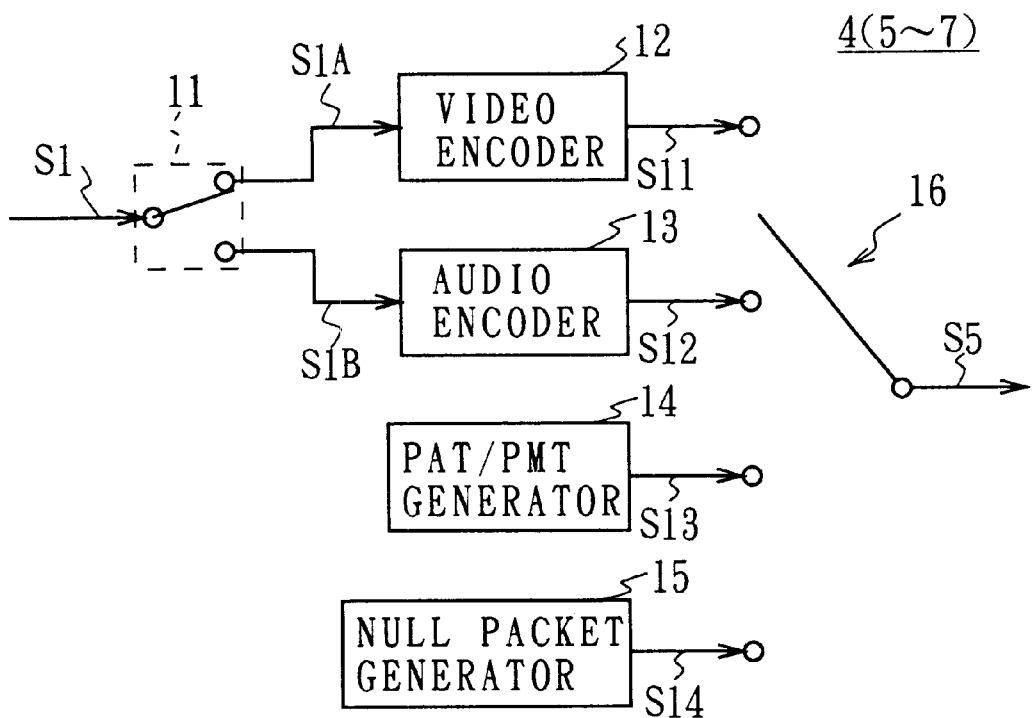
FIG. 22 is a block diagram showing the constructions of encoder 4 to 7 of FIG. 5.
FIG. 24 is a table explaining the regenerating of PID.

In this embodiment, as shown in FIG. 22, the encoders 4 to 7 basically have the same structure, and respectively encode the inputted video and audio data S1 to S4 separately. Hereinafter, since the structures are the same, the encoder 4 will be described.

The inputted video and audio data S1 is inputted to a switch 11. The switch 11 supplies video data S1A out of the video and audio data S1 to a video encoder 12 and supplies audio data S1B to an audio encoder 13.

The video encoder 12 sequentially encodes the inputted video data S1A in accordance with the MPEG2 system and moreover, packets the encoded video data for every fixed block in the packet structure shown in FIG. 1, and outputs a resultant transport stream S11.

The audio encoder 13 sequentially encodes the inputted audio data S1B in accordance with the audio standard system of the MPEG2 and moreover, packets the encoded audio data for every fixed block in the packet structure shown in FIG. 1, and outputs a resultant transport stream S12.

Further, a PAT/PMT generator 14 provided in the encoder 4 generates PMT and PAT corresponding to the video TS packet and the audio TS packet which are respectively generated at the video encoder 12 and the audio encoder 13, packets them in the packet structure shown in FIG. 1, and output a resultant transport stream S13. In this time, the PAT/PMT generator 14 generates PMT showing PID values of TS packets in which the video data and audio data are stored, and then generates PAT showing PID values of TS packets in which the PMT is stored, and packets and outputs them.

Furthermore, a null packet generator 15 is for generating null packets which do not have meanings as data, and generates a null packet when the transmission capacity is not full of the volume of transmission data, and output a resultant transport stream S14.

Each of the transport streams S11 to S14 respectively generated by the video encoder 12, the audio encoder 13, the PAT/PMT generator 14, and the null packet generator 15 as described above is inputted to the switch 16. The transport streams S11 to S14 are multiplexed and converted into a single transport stream S5 by switching the switch 16 in order.

In this connection, the video encoder 12, the audio encoder 13, the PAT/PMT generator 14, and the null packet generator 15 are controlled so as to output the transport streams S11 to S14 respectively when the switch 16 is connected.

Figure 23:
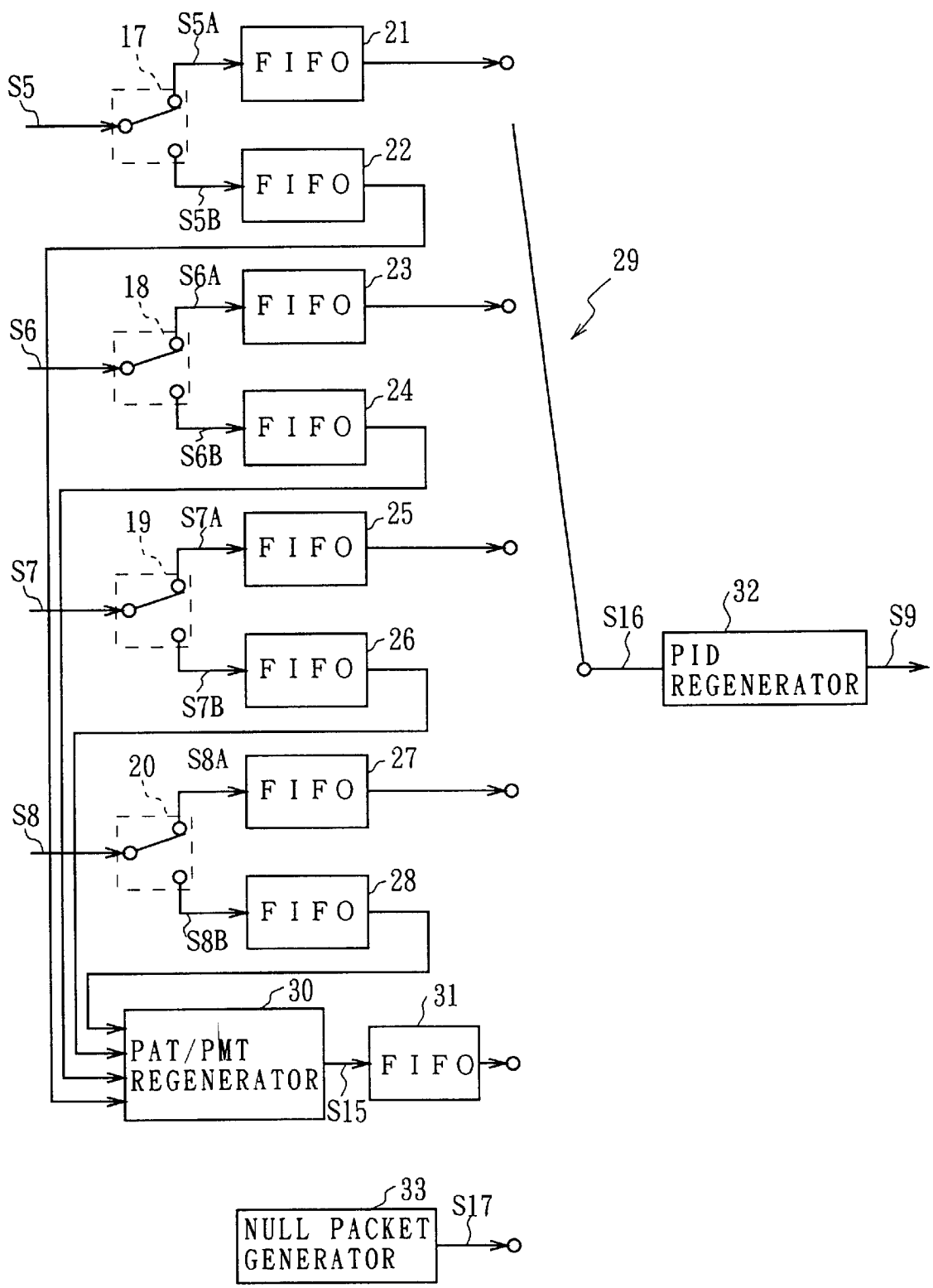
FIG. 23 is a block diagram showing the construction of a multiplexer 8 of FIG. 5.

On the other hand, the multiplexer 8 has a structure shown in FIG. 23, and inputs the transport streams S5 to S8 respectively supplied from the encoders 4 to 7 to switches 17 to 20 respectively. The switch 17 supplies TS packet S5A of video and audio being element data out of the transport stream S5 to a buffering memory (FIFO) 21, and supplies TS packet S5B of PAT and PMT being system data out of the transport stream S5 to a buffering memory (FIFO) 22.

Hereinafter, in a similar way, the switch 18 supplies TS packet S6A of video and audio out of the transport stream S6 to a memory (FIFO) 23, and supplies TS packet S6B of PAT and PMT out of the transport stream S6 to a memory (FIFO) 24. Further, the switch 19 supplies TS packet S7A of video and audio out of the transport stream S7 to a memory (FIFO) 25, and supplies TS packet of PAT and PMT out of the transport stream S7 to a memory (FIFO) 26. Furthermore, the switch 20 supplies TS packet S8A of video and audio out of the transport stream S8 to a memory (FIFO) 27, and supplies TS packet S8B of PAT and PMT out of the transport stream S8 to a memory (FIFO) 28. In this way, the multiplexer 8 performs a separating operation of the transport streams S5 to S8 by switching the switches 17 to 20.

The memories 21 to 28 temporarily stores the respective inputted TS packets to perform the buffering processing. The memories 21, 23, 25, 27 out of the memories 21 to 28 output the respective stored TS packets at multiplexing timings by the latter stage of the switch 29. On the other hand, the memories 22, 24, 26, and 28 output the respective stored TS packets at predetermined timings to the latter stage of the PAT/PMT regenerator 30.

The PAT/PMT regenerator 30 is a circuit for regenerating the PAT and PMT generated for every program, extracts PAT, PMT of each program from each of supplied TS packets, newly regenerates PAT and PMT referring them, and packets and outputs the PAT and PMT. Specifically, the PATs generated for every program are combined into one, and the PID values of PMT written in the PAT are changed depending on the change of PID values performed by the PID regenerator 32 described later. Further, as for PMT, the PID values of TS packets of video and audio written in the PMT is changed depending on the change of the PID values performed by the PID regenerator 32 in a similar way. Thereby, the PAT, PMT generated for every program can match to the multiplexed transport stream S9. Note that, if a plurality of PATs exists in a single transport stream S9, the receiver side may not know to refer any PAT. Therefore, the digital broadcasting system 1 can avoid this inconvenience by deciding one PAT per a single transport stream S9.

Thus regenerated TS packet (S15) of PAT and PMT is supplied to a buffering memory (FIFO) 31. The memory 31 temporarily stores the supplied TS packet of PAT and PMT and outputs it at a multiplexing timing by the latter stage of the switch 29.

The switch 29 switches at a predetermining timing to convert the TS packets outputted from the memories 21, 23, 25, 27, and 31 into a single transport stream S16 by multiplexing and output it to the PID regenerator 32.

In this connection, the null packet generator 33 is a circuit for generating a null packet when any of the memories 21, 23, 24, 27, and 31 is empty. The switch 29 selects a transport stream S17 being null packets when any of memories 21, 23, 25, 27, and 31 is empty to compensate the lack of the transmission capacity.

The PID regenerator 32 re-adds PIDs added to the respective TS packets of the transport streams S16 so as not to the overlap of PID values, and outputs the resultant transport stream S9. For example, as shown in FIG. 24, since each of encoders 4 to 7 adds "0X0100" PID to all the video TS packets, and "0X0101" PID to all the audio TS packets, that is, the same PID value is added to different programs, the receiver side may not correctly decode a desired program because it may decode a wrong program.

For this reason, the PID regenerator 32 newly re-adds "0X0102" PID to the video TS packet generated by the encoder 5 and "0X0103" PID to the audio TS packet generated by the encoder 5, newly re-adds "0X0104" PID to the video TS packet generated by the encoder 6 and "0X0105" PID to the audio TS packet generated by the encoder 6, and newly re-adds "0X0106" PID to the video TS packet generated by the encoder 7 and "0X0107" PID to the audio TS packet generated by the encoder 7. Thereby, the PID regenerator 32 can avoid the overlap of PID values and correctly decode at the receiver side. Note that, the PID regenerator 32 changes the PID value of TS packet in which PMT is stored, into a predetermined PID value so as not to overlap.

After the transport streams are converted into a single stream by being multiplexed in this way, the transport stream S9 of which the PID value is changed is supplied to the modulator 9 described above, and the modulator 9 performs a predetermined modulation on the transport stream S9 and then sends it via the transmitting antenna 10.

In this way, in the transmitting device 2Y (FIG. 21), the transport streams S5 to SB generated by encoders 4 to 7 respectively are multiplexed by the multiplexer 8 to transmit video and audio data of plural programs through one circuit. In this case, the PAT, PMT for every program generated by each of encoders 4 to 7 are regenerated by the PAT/PMT regenerator 30 of the multiplexer 8, thereby the PAT, PMT matching to the multiplexed transport stream S9 are added. Further, the PID value of TS packet added at each of encoders 4 to 7 in similar way is re-added by the PID regenerator 32 of the multiplexer 8 and thereby, the PID values do not overlap in the transport stream S9.

However, in the transmitting device 2Y in FIG. 21, in the case where the PAT and PMT matching to the multiplexed transport stream S9 are added by regenerating the PAT and PMT generated by the each of encoders 4 to 7, the structure becomes complicated. Similarly, in the transmitting device 2Y in FIG. 21, in the case where the overlap of PID values is avoided by re-adding PID added at each of encoders 4 to 7 once, the structure becomes complicated.

Figures 25, 27:
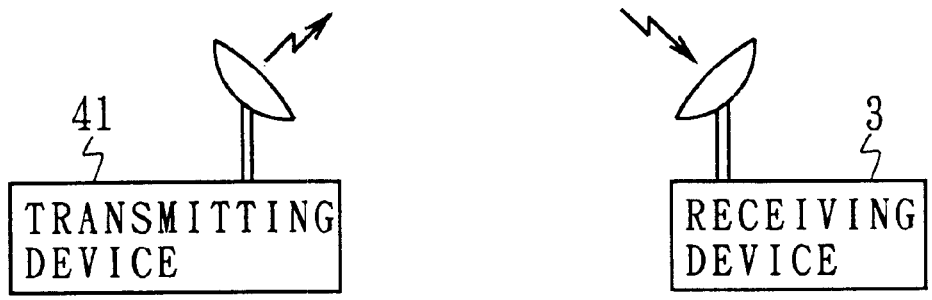
FIG. 25 is a block diagrams showing a digital broadcasting system 40 according to the second embodiment of this invention.
FIG. 27 is a table showing PID values which are assigned to each encoder.

In order to solve such problems, in the case of this embodiment, as shown in FIG. 25 in which the same reference numerals are applied to parts corresponding to FIG. 3, in the digital broadcasting system 40, the transmitting device 41 multiplexes video and audio data of a plurality of programs to transmit it using a satellite wave, and the receiving device 3 extracts and decodes video and audio data of a desired program desired by an audience, from the reception data, thereby a program desired by the audience is reproduced.

Figure 26:
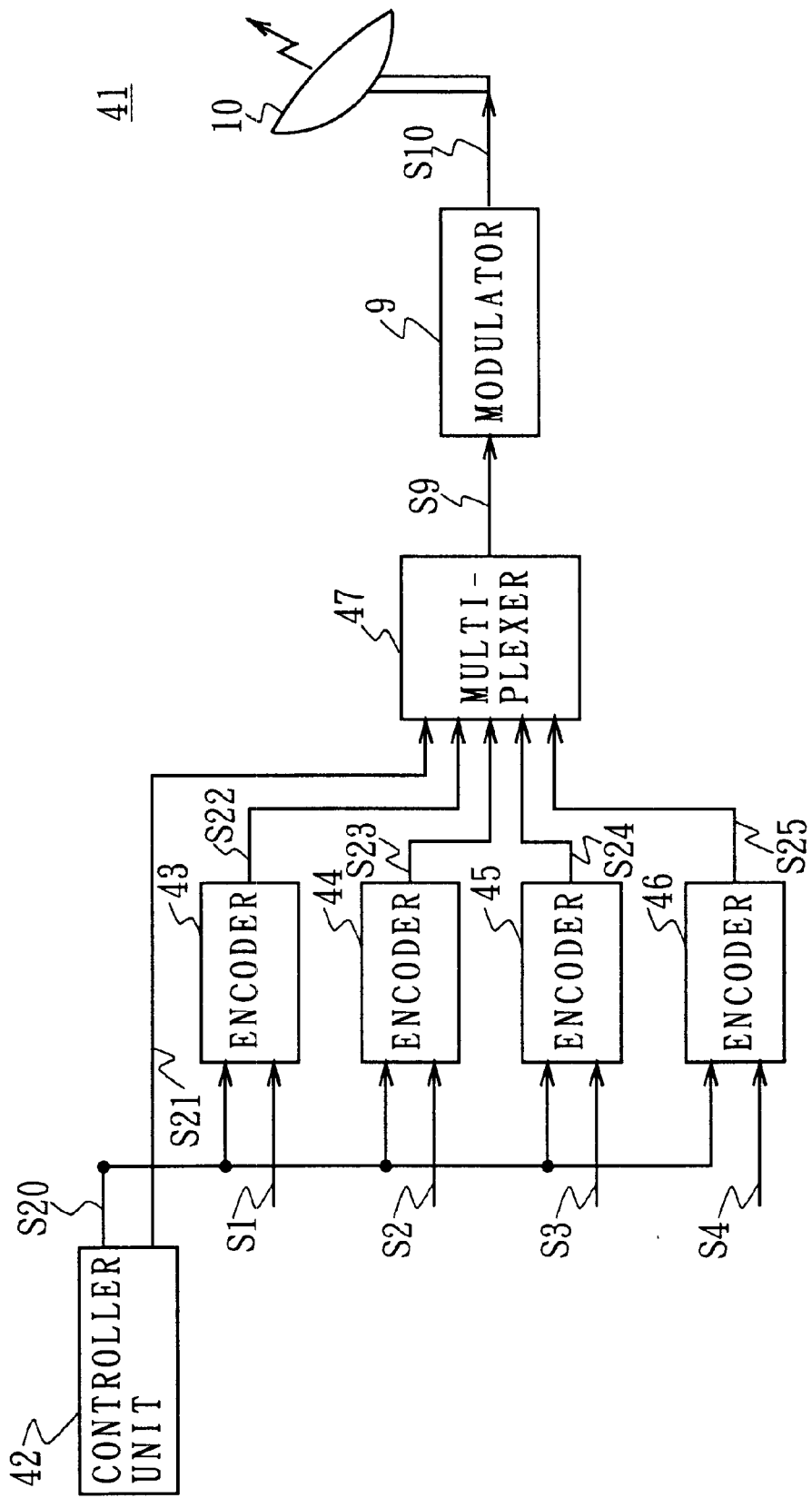
FIG. 26 is a block diagram showing a transmitting device 41 of FIG. 25.

Here, FIG. 26 in which the same reference numerals are applied to parts corresponding to FIG. 21 shows the structure of a transmitting device 41 according to this embodiment. As shown in FIG. 26, the transmitting device 41 newly has a controller unit 42, and has encoders 43 to 46 for performing an encoding processing and a multiplexer 47 for performing a multiplexing processing which respectively have the structures different from those of the transmitting device 2Y shown in FIG. 21.

The controller unit 42 is a control means for controlling PID values of TS packets and is an additional information generating means for generating additional information such as PAT and PMT. The controller unit 42 outputs a control signal S20 to the respective encoders 43 to 46 to assign the PID values different from each other to the respective encoders 43 to 46 so that the PID values of TS packets generated by the respective encoders 43 to 46 do not overlap. For example, as shown in FIG. 27, the controller unit 42 uses the control signal S20 to instruct the encoder 43 to add "0X0100" PID to the video TS packet and of adding "0X0101" PID to the audio TS packet. Further, the controller unit 42 instructs the encoder 44 to add "0X0102" PID to the video TS packet and of adding "0X0103" PID to the audio TS packet. Similarly, the encoder 45 is instructed to add "0X0104" PID to the video TS packet and of adding "0X0105" PID to the audio TS packet and moreover, the encoder 46 is instructed to add "0X0106" PID to the video TS packet and of adding "0X0107" PID to the audio TS packet.

Note that, for example, RS-232C, RS-422A or the like is utilized as a communication protocol for the control signal S20 which is outputted from the controller unit 42.

Further, the controller unit 42 generates PAT and PMT corresponding the multiplexed transport stream S9 based on the PID value assigned described above, and outputs a transport stream S21 obtained by packetting the generated PAT and PMT to the multiplexer 47. Specifically, since the controller unit 42 assigns PID values to the encoders 43 to 46, it previously knows the PID values of TS packets of the respective programs which are outputted from the encoders 43 to 46. The controller unit 42 generates PMT showing the PID values of TS packets in which video and audio data constituting each program are stored and moreover generates PAT showing PID value of TS packet in which the PMT is stored, on the basis of the PID values of the programs, and then packets and outputs the generated PMT and PAT in the packet structure shown in FIG. 1.

Note that, the controller unit 42 adds "0X0000" PID to TS packet in which the PAT is stored, and adds PID which does not overlap with video and audio out of "0X0010" to "0X1FFE" to TS packet in which PMT is stored (see FIG. 2).

The encoders 43 to 46 are encoding means for video and audio data, which encodes the inputted video and audio data S1 to S4 of the respective programs in accordance with the MPEG2 system and moreover, packets and outputs the encoded video and audio data for every fixed block in the packet structure shown in FIG. 1 respectively. In this case, each of the encoders 43 to 46 adds PID to TS packet based on the PID value instructed from the controller unit 42. Further, the encoders 43 to 46 only encode and packet video and audio data and do not generate PAT and PMT. Therefore, the transport streams S22 to S25 outputted from the encoders 43 to 46 do not include TS packets of PAT and PMT, but include video TS packet and audio TS packet which are element data.

The multiplexer 47 is a multiplexing means, which converts the transport streams S22 to S25 consisting of TS packets of video and audio which are supplied from the encoders 43 to 46 and the transport stream S21 consisting of TS packets of PAT and PMT which is supplied from the controller unit 42 into a single transport stream S9 by multiplexing, and outputs it to the modulator 9.

The modulator 9 performs the QPSK modulation (quadrature phase shift keying) on a predetermined carrier wave on the basis of the inputted transport stream S9, and then frequency-converts the frequency of the carrier wave into the frequency bandwidth of the satellite wave, and outputs the resultant transmission signal S10. The transmission signal S10 outputted from the modulator 9 is supplied to the transmitting antenna 10 to be transmitted via the transmitting antenna 10.

Figure 28:
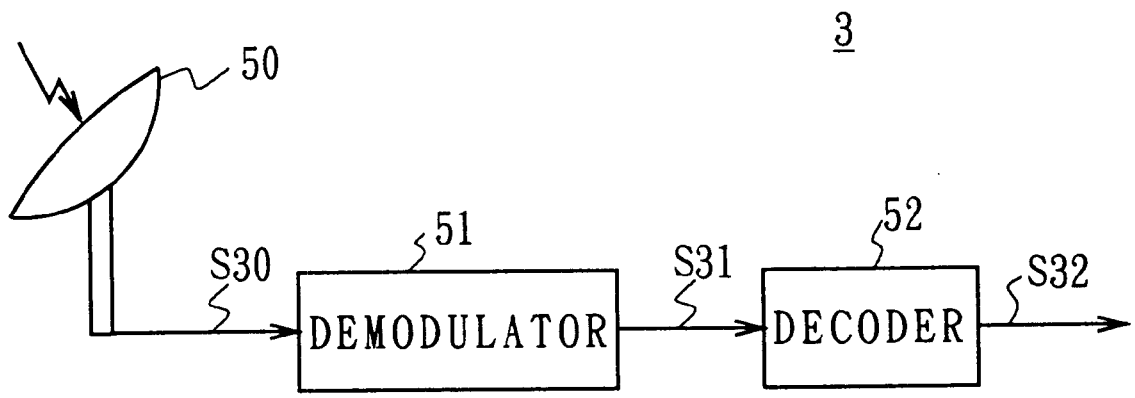
FIG. 28 is a block diagram showing the construction of a receiving device 3 of FIG. 25.

On the other hand, the receiving device 3 is composed of the receiving antenna 50, the demodulator 51, and the decoder 52 as shown in FIG. 28, where the reception signal S30 received by the receiving antenna 50 is inputted to the demodulator 51.

The demodulator 51 frequency-converts the reception signal S30 into a baseband signal, and then demodulates the baseband signal to restore the transport stream S31 corresponding to the transport stream S9 of the transmitter side, and outputs the transport stream S31 to the decoder 52.

The decoder 52 is a decoding means for extracting video TS packet and audio TS packet constituting a program instructed by an audience from the transport stream S31 in accordance with the instruction of the audience inputted from the instructing section not shown and decoding them to reproduce the video and audio data S32. In this case, the decoder 52 first obtains PAT by extracting TS packet in which the PAT is stored and next, extracts TS packet in which PMT of the instructed program is stored by referring to the PAT. Then, the decoder 52 examines the PID values of video TS packet and audio TS packet constituting the instructed program by referring to the obtained PMT, and then extracts TS packet constituting the program based on the examination result.

Thus reproduced video and audio data S32 is supplied, for example, to the television set to be broadcast.

Figure 29:
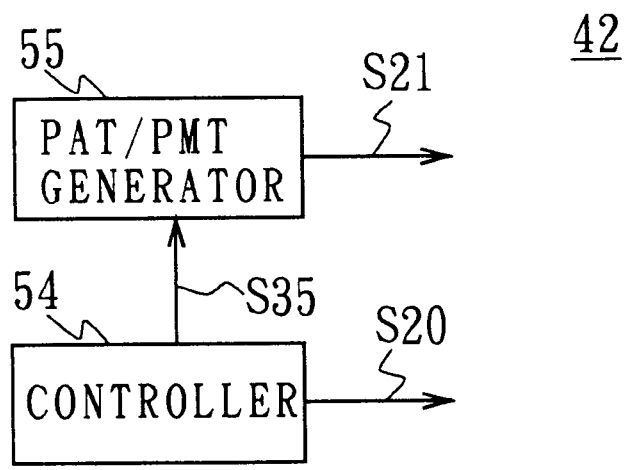
FIG. 29 is a block diagram showing the construction of a controller unit 42 of FIG. 26.

Here, the aforementioned controller unit 42 of the transmitting device 41 will be described in detail with reference to FIG. 29. The controller unit 42 is composed of a controller 54 and a PAT/PMT generator 55. The controller 54 is equivalent to a control means for controlling the PID values to instruct the respective encoders 43 to 46 as described above and assigning PID values different from each other to the respective encoders 43 to 46 by outputting the control signal S20. In addition, the controller 54 informs the PAT/PMT generator 55 of the PID values assigned to the respective encoders 43 to 46 by outputting the control signal S35.

The PAT/PMT generator 55 is an additional information generating means, which knows the PID values assigned to the respective encoders 43 to 46 by the control signal S35 supplied from the controller 54, thereby generates PMT showing PID values of TS packets in which video and audio data consisting the respective program based on the PID values and moreover, generates PAT showing the PID value of TS packet in which the PMT is stored. Then, the PAT/PMT generator 55 converts the generated PAT and PMT into TS packets and then outputs the resultant transport stream S21 to the multiplexer 47. Note that, when the PAT and PMT are packetted, the PAT/PMT generator 55 adds "0X0000" PID to the TS packet in which the PAT is stored and adds PID which does not overlap with video and audio out of "0X0010" to "0X1FFE" to the TS packet in which the PMT is stored.

Figure 30:
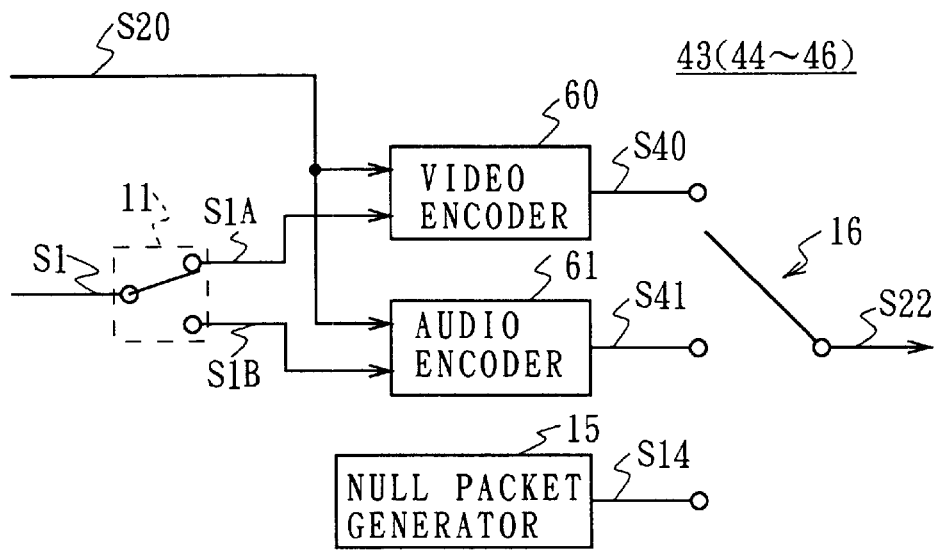
FIG. 30 is a block diagram showing the construction of encoder 43 to 46 according to the embodiment of FIG. 26.

Next, the aforementioned encoders 43 to 46 of the transmitting device 41 will be described with reference to FIG. 30 in which the same reference numerals are applied to parts corresponding to FIG. 22. However, since the encoders 43 to 46 have the same structure, the encoder 43 will be described here. In the encoder 43, the inputted video and audio data S1 is inputted to a switch 11 at first. The switch 11 supplies the video data S1A out of the video and audio data S1 to the video encoder 60 and the audio data SIB to the audio encoder 61.

In the video encoder 60, the control signal S20 from the controller unit 42 is inputted to instruct to add "0X0100" PID to TS packet. The video encoder 60 sequentially encodes the inputted video data S1A in accordance with the MPEG2 system, and packets the encoded video data for every fixed block in the packet structure shown in FIG. 1 to output the resultant transport stream S40. In this time, the video encoder 60 adds "0X0100" PID to the generated video TS packet.

In the audio encoder 61, the control signal S20 from the controller unit 42 is also inputted to instruct to add "0X0101" PID to the TS packet. The audio encoder 61 sequentially encodes the inputted audio data SIB in accordance with the audio standard of the MPEG2, and packets the encoded audio data for every fixed block in the packet structure shown in FIG. 1 to output the resultant transport stream S41. In this time, the audio encoder 61 adds "0X0101" PID to the generated audio TS packet.

The null packet generator 15 is a circuit for generating null packets. In the case where the data volumes of the transport streams S40 and S41 do not fill the transmitting capacities, the null packet generator 15 generates the null packet to output the resultant transport stream S14.

The switch 16 multiplexes the transport streams S40, S41, S14 respectively outputted from the video encoder 60, the audio encoder 61, and the null packet generator 15, by switching at a predetermined timing, in order to convert them into a single transport stream S22.

In this connection, the video encoder 60, the audio encoder 61, the null packet generator 15 are controlled so as to output the transport streams S40, S41, S14 when connected with the switch 16 respectively. Thereby, the transport stream S40, S41, S14 can be multiplexed without the lack of information.

Figure 31:
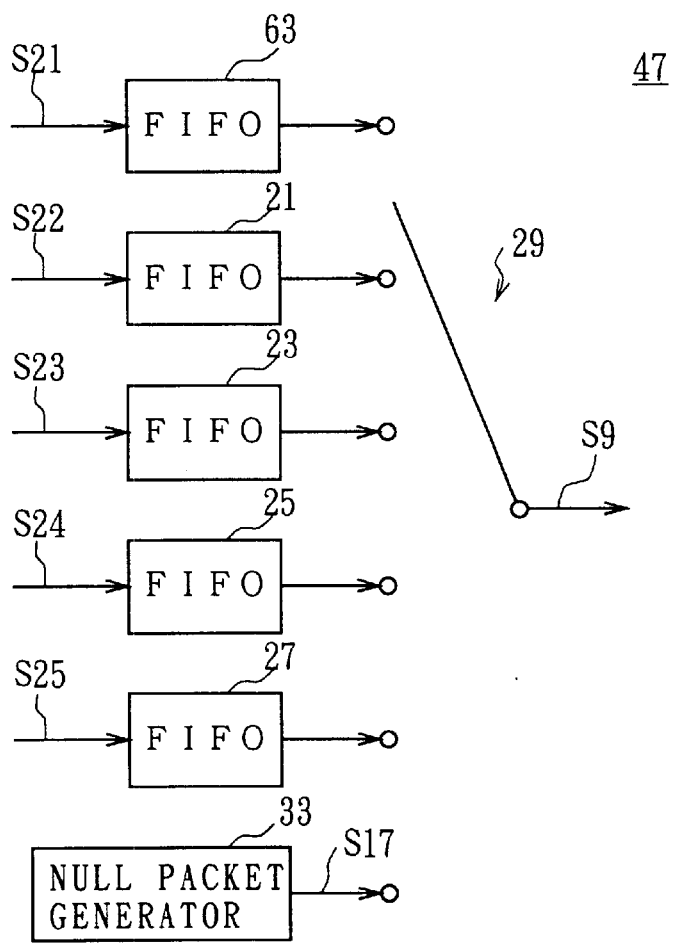
FIG. 31 is a block diagram showing the construction of a multiplexer 47 according to the embodiment of FIG. 26.

Next, the aforementioned multiplexer 47 of the transmitting device 41 will be described with reference to FIG. 31 in which the same reference numerals are applied to parts corresponding to FIG. 23.

The multiplexer 47 is composed of buffer memories (FIFO) 63, 21, 23, 25, and 27, a null packet generator 33, a switch 29, and the memories 22, 24, 26, and 28, the PAT/PMT regenerator 30, the PID regenerator 32 are deleted relative to FIG. 23.

The transport stream S21 comprising of TS packets of PAT and PMT supplied from the controller unit 42 is inputted to the memory 63, and the transport streams S22 to S25 comprising of the video and audio TS packets supplied from the respective encoders 43 to 46 are inputted to the memories 21, 23, 25, and 25 respectively.

The memories 63, 21, 23, 25, and 27 temporarily stores the inputted transport streams S21 to S25 respectively to perform a buffering processing, and then output the transport streams S21 to S25 at multiplexing timings of the latter stage of the switch 29 respectively.

The switch 29 multiplexes the transport streams S21 to S25 outputted from the respective memories 63, 21, 23, 25, and 27 by switching at a predetermining timing to convert them into a single transport stream S9.

In this connection, the null packet 33 is a circuit for generating null packets when any of the memories 63, 21, 23, 25, and 27 is empty. The switch 29 selects the transport stream S17 comprising of null packets when any of the memories 63, 21, 23, 25, and 27 is empty, in order to compensate the lack of the transmission capacity.

According to the foregoing construction, the controller unit 42 controls the PID values of TS packets to be generated at the encoders 43 to 46 and instructs the encoders 43 to 46 to add PID values different from each other. More specifically, the controller unit 42 sends a command to the encoder 43 to add "0X0100" PID to the video TS packet and "0X0101" PID to the audio TS packet, and sends a command to the encoder 44 to add "0X0102" PID to the video TS packet and to add "0X0103" PID to the audio TS packet. Furthermore, it sends a command to the encoder 45 to add "0X0104" PID to the video TS packet and to add "0X0105" PID to the audio TS packet, and sends a command to the encoder 46 to add "0X0106" PID to the video TS packet and to add "0X0107" PID to the audio TS packet.

Upon receiving the commands, the respective encoders 43 to 46 encode the inputted video and audio data S1 to S4 of the respective programs and simultaneously packet these encoded video and audio data for every fixed block, and add the assigned PID to the generated TS packets. The transport streams S22 to S25 to be outputted from the respective encoders 43 to 46 are inputted to the multiplexer 47 to be converted into a single transport stream S9 by being multiplexed. In this case, in the respective encoders 43 to 46, since PID values different from each other are added to the TS packets on the based on the instructions of the controller unit 42, the PIDs of the TS packets would never overlap in the transport stream S9 even if transport streams are converted into a single transport stream S9 by being multiplexed by the multiplexer 47. Thus, the receiving device 3 can previously avoid decoding a wrong program.

With this arrangement, in the transmitting device 41, since the controller unit 42 instructs the encoders 43 to 46 of PID values different from each other and the encoders 43 to 46 assign PIDs to the TS packets based on the instructions respectively, the overlap of PIDs can be prevented without regenerating PID in the multiplexer as the construction shown in FIG. 23. Accordingly, the construction of the transmitting device 41 can be further simplified.

Furthermore, in the transmitting device 41, the controller unit 42 generates PMT and PAT matching to the contents of the multiplexed transport stream S9 based on the PID values which the controller unit 42 instructs the respective encoders of, in order to packet and output the generated PMT and PAT. The TS packet (S21) of the PMT and PAT is supplied to the multiplexer 47 and then multiplexed together with video and audio TS packets (S22 to S25) which is supplied from the respective encoders 43 to 46.

In this way, in the transmitting device 41, the controller unit 42 generates PMT and PAT matching to the contents of the multiplexed transport stream S9 and the multiplexer 47 only multiplexes the PMT and PAT TS packets onto the video and audio TS packet. Thus, in the transmitting device 41, the constructions of multiplexer 47 and the encoders 43 to 46 can be simplified as compared with the case where PMTs and PATs generated by the respective encoders 4 to 7 are regenerated by the multiplexer 8 as the construction shown in FIG. 23

Accordingly, the construction of the transmitting device 41 can be simplified as compared with the transmitting device 2Y shown in FIG. 21. In this connection, an experiment proved that the circuit configuration of this embodiment can be simplified to one third the configuration of FIG. 21.

According to the foregoing construction, since the controller unit 42 instructs the respective encoders 43 to 46 to PID values different from each other and the respective encoders 43 to 46 add the PID values to the TS packets based on the instructions, the overlap of PIDs can be avoided without regenerating the PID when TS packets generated at the respective encoders 43 to 46 are multiplexed. Thus, the construction of the transmitting device 41 can be simplified because PID is not regenerated.

Furthermore, since the controller unit 42 generates the PMT and PAT matching to the multiplexed transport stream S9 and the multiplexer 47 simply multiplexes the TS packet of the PMT and PAT onto the video and audio TS packets to be supplied from the respective encoders 43 to 46, the PMT and PAT matching to the multiplexed transport stream S9 can be generated without regenerating the PMT and PAT, and thereby the construction of the transmitting device 41 can be simplified.

Figure 32:
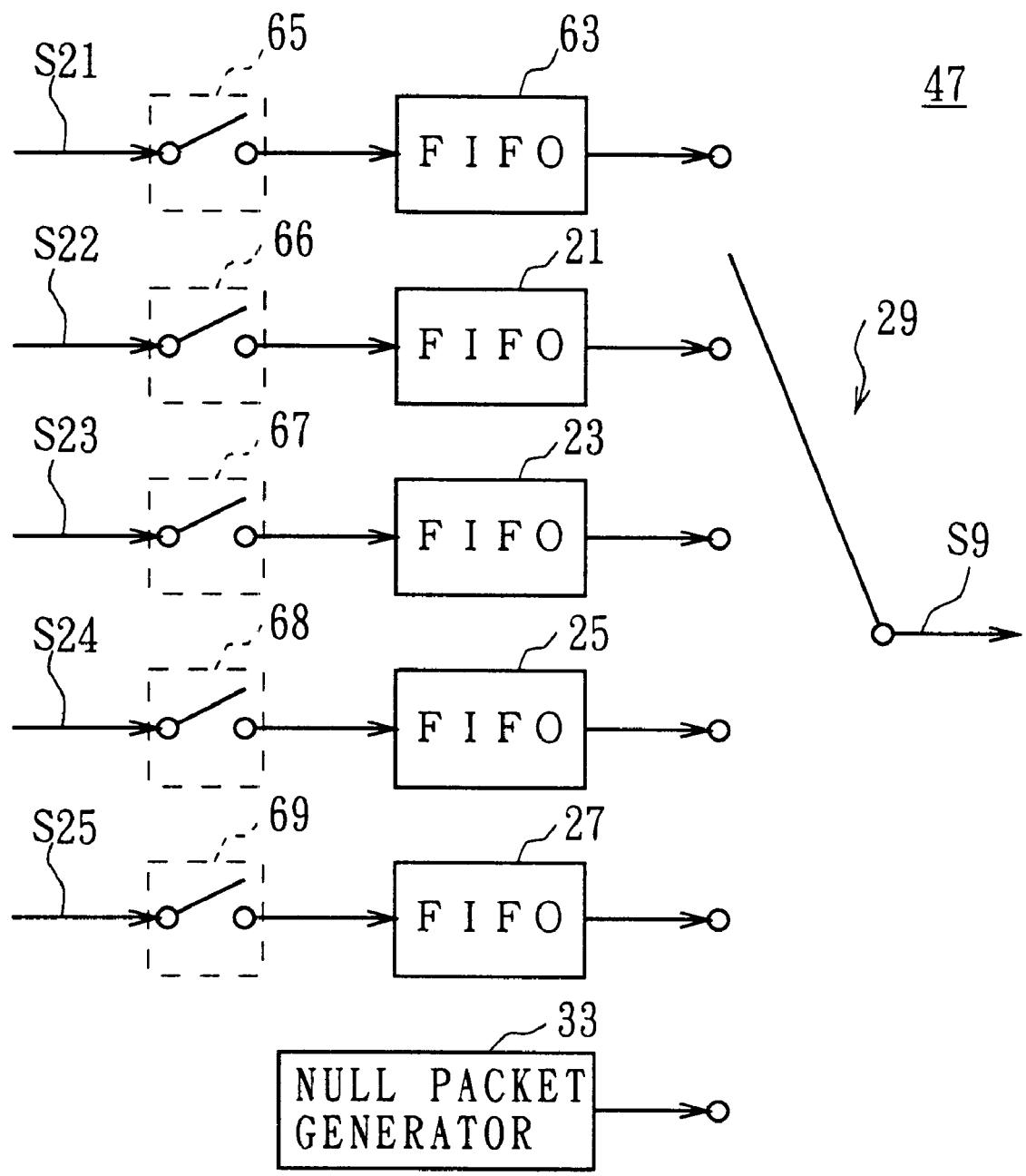
FIG. 32 is a block diagram showing the construction of the multiplexer 47 according to another embodiment.

Note that, the aforementioned embodiment has dealt with the case of simply multiplexing the transport streams S21 to S25 inputted to the multiplexer 47. However, the present invention is not only limited thereto and, for example, as shown in FIG. 32, the switches 65 to 69 may be provided at the preceding stages of the memories 63, 21, 23, 25 and 27 respectively in the multiplexer 47 to remove null packets in the transport streams S21 to S25. With this arrangement, when the data volume of the transport stream S9 may exceed the transmission capacity, the data volume of the transport stream S9 can be adjusted by removing the null packets. Thus, the excess of the transmission capacity can be easily avoided.

Further, the aforementioned embodiment has dealt with the case of transmitting the transport stream S9 in utilizing the satellite wave in the transmitting device 41. However, the present invention is not only limited thereto and the transport stream S9 may be transmitted via the ground wave or via a predetermined wire cable or utilizing the predetermined public circuit net. In short, the transport stream S9 may be transmitted to the predetermined transmitting line.

Furthermore, the embodiment described above has dealt with the case of using the QPSK modulation as the modulation system of the modulator 9. However, the present invention is not limited thereto and the QAM modulation (quadrature amplitude modulation) and the OFDM modulation (orthogonal frequency division multiplex) may be used as the modulation system of the modulator 9.

Furthermore, the embodiment described above has dealt with the case of multiplexing four pieces of video and audio data S1 to S4 supplied, i.e., 4-channel multiplexing. However, the present invention is not only limited to this but also 6-channel multiplexing or 8-channel multiplexing may be used. In short, the number of channels would not be limited. According to the present invention, since the PAT/PMT generator in the encoder can be removed, the more the number of channels increases, overall construction can be further simplified.

Moreover, the embodiment described above has dealt with the case of providing the null packet generators 15, 33 in encoders 43 to 46 and the multiplexer 47. However, the present invention is not only limited to this but also null packet generator may not be provided in the encoders and multiplexer in the case where the data volumes of video and audio data S1 to S4 to be supplied are controlled in advance so as not to lack the transmission capacity when multiplexed.

Furthermore, the embodiment described above has dealt with the case where the controller unit 42 generates additional information such as PAT and PMT as well as controlling the PID value. However, the present invention is not limited to the above but also the controller unit 42 may performs one of these. If one of these may be performed, at least the construction of the transmitting device can be more simplified than the construction shown in FIGS. 21 to 23.

Furthermore, the embodiment described above has dealt with the case of applying the present invention to the transmitting device 41 for generating and transmitting the first corresponding table (PMT) showing the PID values of TS packets in which video and audio data (S1 to S4) are stored and the second corresponding table (PAT) showing the PID value of TS packet in which the first table is stored. However, the present invention is not only limited to this but also it may be widely applied to the transmitting device which simply forms and transmits additional information showing the relationship between input data and packet identifier.

Moreover, the embodiment described above has dealt with the case of multiplexing a plurality of video and audio data inputted. However, the present invention is not only limited to this but also it may be applied to multiplex only a plurality of video data inputted or multiplex only a plurality of audio data inputted.

Furthermore, the embodiment described above has dealt with the case of applying the present invention to the transmitting device 41 for multiplexing and transmitting video and audio data. However, the present invention is not only limited to this but also it may be widely applied to the transmitting device for multiplexing and transmitting a plurality of input data inputted.

According to the present invention as described above, since control means for controlling packet identifiers to be added at the encoding means and for instructing to add packet identifiers different from each other to a plurality of encoding means, the overlap of packet identifiers can be easily avoided without regenerating packet identifiers. Thus, the construction of transmitting device can be further simplified because of not regenerating the packet identifiers.

Furthermore, according to the present invention, since the additional information generating means for generating additional information showing the relationship between the input data and the packet identifier on the basis of the packet identifier to be added by the encoding means and for packetting and outputting the additional information is provided, additional information matching to the multiplexed packet line can be generated without regenerating additional information. Thus, the construction of transmitting device can be further simplified because of not regenerating the additional information.

Industrial Applicability

The present invention can be utilized for a digital broadcasting system for transmitting information such as video and audio as digital information.

What is claimed is:

1. An information transmitting device comprising:

means for encoding input data
   to generate a first encoded stream and for generating first additional information corresponding to said first encoded stream;

means for receiving a transport stream including a second encoded stream and second additional information corresponding to said second encoded stream, said second encoded stream and said second additional information being generated by another transmitting device;

means for generating third additional information by integrating said first additional information and said second additional information for regeneration; and multiplexing means for multiplexing said third additional information, said first encoded stream, and said second encoded stream.

2. The information transmitting device according to claim 1, wherein said first and second encoded streams include video data and/or audio data.

3. The information transmitting device according to claim 1, wherein:

said multiplexing means comprises packet identifier modifying means for modifying packet identifiers so that a packet identifier added to each packet of said second encoded stream differs from a packet identifier added to each packet of said first encoded stream.

4. An information transmitting device, comprising:

means for encoding input data to generate a first encoded stream;

means for receiving a transport stream including a second encoded stream and second additional information corresponding to said second encoded stream, said second encoded stream and said second additional information being generated by another transmitting device;

means for receiving said second additional information and for generating third additional information by integrating first additional information corresponding to said first encoded stream and said second additional information; and multiplexing mean for multiplexing said third additional information, said first encoded stream, and said second encoded stream.

5. The information transmitting device according to claim 4, wherein said first and second encoded streams include video data and/or audio data.

6. The information transmitting device according to claim 4, wherein:

said multiplexing means comprises packet identifier modifying means for modifying packet identifiers so that a packet identifier added to each packet of said second encoded stream differs from a packet identifier added to each packet said first encoded stream.

7. An information transmitting method, comprising the steps of:

encoding input data
   generate a first encoded stream;

generating first additional information corresponding to said first encoded stream;

receiving a transport stream including a second encoded stream and second additional information corresponding to said second encoded stream, said second encoded stream and said second additional information being generated by another transmitting device;

generating third additional information by integrating said first additional information and said second additional information for regeneration; and multiplexing said third additional information, said first encoded stream, and said second encoded stream.

8. The information transmitting method according to claim 7, wherein said first and second encoded streams include video data and/or audio data.

9. The information transmitting method according to claim 7, wherein:

said multiplexing step comprises a packet identifier modifying step of modifying packet identifiers so that a packet identifier added to each packet of said second encoded stream differs from a packet identifier added to each packet of said first encoded stream.

10. An information transmitting method, comprising the steps of:

encoding input data to generate a first encoded stream;

receiving a transport stream including a second encoded stream and second additional information corresponding to said second encoded stream, said second encoded stream and said second additional information being generated by another transmitting device;

receiving said second additional information and for generating third additional information by integrating first additional information corresponding to said first encoded stream and said second additional information; and multiplexing said third additional information, said first encoded stream, and said second encoded stream.

11. The information transmitting method according to claim 10, wherein said first and second encoded streams include video data and/or audio data.

12. The information transmitting method according to claim 10, wherein:

said multiplexing step comprises a packet identifier modifying step of modifying packet identifiers so that a packet identifier added to each packet of said second encoded stream differs from a packet identifier added to each packet of said first encoded stream.

13. An apparatus for transmitting a transport stream, the apparatus comprising:

means for encoding a first source program to generate a first encoded stream and for generating first program specific information corresponding to said first encoded stream, wherein said first program specific information has a first packet identifier that identifies said first encoded stream;

means for receiving a transport stream including a second encoded stream and second program specific information corresponding to said second encoded stream, said second encoded stream and said second program specific information being generated by another transmission system, wherein said second program specific information has a second packet identifier that identifies said second encoded stream;

means for modifying said first packet identifier to be assigned to said first encoded stream and said first program specific information so that said first packet identifier does not match said second packet identifier; and means for multiplexing said first encoded stream, said first program specific information including said modified first packet identifier, said second encoded stream and said second program specific information.

14. A method of transmitting a transport stream, comprising the steps of:

encoding a first source program to generate a first encoded stream and for generating first program specific information corresponding to said first encoded stream, wherein said first program specific information has a first packet identifier that identifies said first encoded stream;

receiving a transport stream including a second encoded stream and second program specific information corresponding to said second encoded stream, said second encoded stream and said second program specific information being generated by another transmission system, wherein said second program specific information has a second packet identifier that identifies said second encoded stream;

modifying said first packet identifier to be assigned to said first encoded stream and said first program specific information so that said first packet identifier does not match said second packet identifier; and multiplexing said first encoded stream, said first program specific information including said modified first packet identifier, said second encoded stream and said second program specific information.

* * * * *